(12) United States Patent
Mohseni et al.

(10) Patent No.: US 12,731,202 B2
(45) Date of Patent: Sep. 8, 2026

(54) SYSTEMS AND METHODS FOR RESTRICTING NETWORK INTERACTIONS ACCORDING TO LANGUAGE MODEL OUTPUT

(71) Applicant: DK Crown Holdings Inc., Boston, MA (US)

(72) Inventors: Robin Mohseni, Billericay (GB); Gengyuan Zhang, Boston, MA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/360,405

(22) Filed: Oct. 16, 2025

(65) Prior Publication Data

US 2026/0112241 A1 Apr. 23, 2026

Related U.S. Application Data

(60) Provisional application No. 63/741,671, filed on Jan. 3, 2025, provisional application No. 63/741,297, filed (Continued)

(51) Int. Cl.
*G07F 17/32* (2006.01)
*G06F 40/35* (2020.01)
(Continued)

(52) U.S. Cl.
CPC ............ *G07F 17/323* (2013.01); *G06F 40/35* (2020.01); *G06F 40/40* (2020.01); *G06Q 50/34* (2013.01);
(Continued)

(58) Field of Classification Search
CPC ............... G07F 17/323; G07F 17/3237; G07F 17/3288; G06F 40/35; G06F 40/40; G06Q 50/34
See application file for complete search history.

(56) References Cited

U.S. PATENT DOCUMENTS

| | | | |
|---|---|---|---|
| 9,558,620 | B2 | 1/2017 | Froy et al. |
| 10,311,670 | B2 | 6/2019 | Brahmandam et al. |

(Continued)

FOREIGN PATENT DOCUMENTS

| | | | |
|---|---|---|---|
| CN | 116310582 | A | 6/2023 |
| WO | WO-2023/064563 | A1 | 4/2023 |

(Continued)

OTHER PUBLICATIONS

Cureton, et al., "Federated learning for intent classification." In 2023 IEEE 19th International Conference on Intelligent Computer Communication and Processing (ICCP), pp. 315-322. IEEE, 2023. (Year: 2023).

(Continued)

*Primary Examiner* — Carl V Larsen
(74) *Attorney, Agent, or Firm* — Foley & Lardner LLP

(57) ABSTRACT

Described herein are systems and methods for generating restrictions for network interactions according to language model output. A system can receive a prompt from a client device associated with a player profile and, using a language model, generate an output message indicating values for creation of a wager opportunity. Based on the values, the system can generate the wager opportunity comprising a set of wager attributes. The system can determine that the wager opportunity fails to satisfy at least one restriction for generated wager opportunities. Using the language model and the wager attributes, the system can generate a second output message indicating the failure to satisfy the restriction and provide the second output message to the client device in response to the prompt.

20 Claims, 6 Drawing Sheets

Related U.S. Application Data on Jan. 2, 2025, provisional application No. 63/719,406, filed on Nov. 12, 2024, provisional application No. 63/711,415, filed on Oct. 24, 2024, provisional application No. 63/708,528, filed on Oct. 17, 2024, provisional application No. 63/708,492, filed on Oct. 17, 2024, provisional application No. 63/708,504, filed on Oct. 17, 2024, provisional application No. 63/708,509, filed on Oct. 17, 2024, provisional application No. 63/708,542, filed on Oct. 17, 2024, provisional application No. 63/708,554, filed on Oct. 17, 2024.

(51) Int. Cl.
*G06F 40/40* (2020.01)
*G06Q 50/34* (2012.01)

(52) U.S. Cl.
CPC ...... *G07F 17/3237* (2013.01); *G07F 17/3288* (2013.01)

(56) References Cited

U.S. PATENT DOCUMENTS 10,825,303 B2 11/2020 Mcdonald et al.
10,950,086 B2 3/2021 Brahmandam et al.
11,094,171 B2 8/2021 Huke et al.
11,574,522 B1 * 2/2023 Mendell .............. G07F 17/3239
11,622,156 B1 * 4/2023 Mendell ............. H04N 21/4532 463/25
11,704,000 B1 7/2023 Mcivor et al.
11,735,006 B2 8/2023 Nelson et al.
11,756,379 B2 9/2023 Huke et al.
11,763,637 B2 9/2023 Huke et al.
11,776,362 B2 * 10/2023 Nelson ................ G07F 17/3288 463/25
11,785,280 B1 10/2023 Dakss et al.
12,008,862 B2 6/2024 Inamdar et al.
12,067,039 B1 8/2024 Campos et al.
12,067,849 B2 8/2024 Storm et al.
12,079,449 B2 9/2024 Mcivor et al.
12,118,320 B2 10/2024 Gelfenbeyn et al.
12,128,288 B1 10/2024 Redman et al.
12,190,683 B2 1/2025 Huke et al.
12,307,861 B1 * 5/2025 Todisco .................. G06F 40/58
12,322,246 B2 6/2025 Turner
12,361,796 B2 * 7/2025 Joao .................... G07F 17/3211
12,444,266 B2 10/2025 Joao
12,457,239 B1 10/2025 Mantin et al.
12,477,036 B1 11/2025 Tenbuuren et al.
2002/0068633 A1 6/2002 Schlaifer
2008/0311981 A1 12/2008 Schugar et al.
2010/0121808 A1 5/2010 Kuhn
2010/0328066 A1 * 12/2010 Walker ................ G07F 17/3295 704/E15.005
2012/0034974 A1 2/2012 Amaitis et al.
2012/0310926 A1 12/2012 Gannu et al.
2013/0274007 A1 * 10/2013 Hilbert .................... G07F 17/32 463/29
2014/0024435 A1 1/2014 Scott
2014/0289236 A1 9/2014 Agarwal et al.
2015/0038236 A1 2/2015 Robbins et al.
2015/0339884 A1 * 11/2015 Chun .................. G07F 17/3244 463/25
2016/0086441 A1 3/2016 Cohen et al.
2016/0155350 A1 6/2016 Dragicevic et al.
2016/0189483 A1 * 6/2016 Ballman ............. G07F 17/3258 463/28
2016/0196723 A1 * 7/2016 Ballman ................ G06Q 50/34 463/28
2018/0068661 A1 3/2018 Printz
2018/0204417 A1 7/2018 Triplett
2018/0225911 A1 8/2018 Washington et al.
2019/0012876 A1 1/2019 Brahmandam et al.
2019/0122482 A1 4/2019 Amaitis et al.
2019/0318582 A1 10/2019 Barak
2019/0325028 A1 10/2019 Palanichamy et al.
2019/0361966 A1 11/2019 Munro et al.
2019/0362601 A1 * 11/2019 Kline .................. G07F 17/3223
2019/0392684 A1 12/2019 Mcdonald et al.
2020/0027314 A1 1/2020 Pilnock et al.
2020/0118040 A1 4/2020 Dey et al.
2020/0234543 A1 7/2020 Schwartz et al.
2021/0049490 A1 2/2021 Hood
2021/0118264 A1 4/2021 Nelson et al.
2021/0217277 A1 7/2021 Huke et al.
2021/0217278 A1 * 7/2021 Huke .................... G07F 17/323
2021/0233344 A1 7/2021 Amaitis et al.
2021/0248707 A1 8/2021 Huke et al.
2021/0248875 A1 8/2021 Huke et al.
2021/0256650 A1 8/2021 Huke et al.
2021/0272415 A1 9/2021 Huke et al.
2021/0280006 A1 * 9/2021 Pace ................... G07F 17/3239
2021/0299882 A1 9/2021 Cupersmith et al.
2021/0319666 A1 10/2021 Salivar et al.
2021/0319668 A1 10/2021 Huke et al.
2021/0342550 A1 11/2021 Palanichamy et al.
2021/0343122 A1 11/2021 Warren
2021/0375090 A1 * 12/2021 Huke .................. G07F 17/3288
2021/0383645 A1 12/2021 Gupta et al.
2022/0019950 A1 * 1/2022 Sabri .................. G06Q 10/0635
2022/0122601 A1 4/2022 Cronin
2022/0139160 A1 * 5/2022 Huke .................. G07F 17/3288 463/42
2022/0148364 A1 5/2022 Huke et al.
2022/0148365 A1 5/2022 Huke et al.
2022/0157114 A1 5/2022 Huke et al.
2022/0165118 A1 5/2022 Huke et al.
2022/0165120 A1 * 5/2022 Huke ..................... G06N 20/00
2022/0172560 A1 * 6/2022 Huke .................. G07F 17/3227
2022/0188366 A1 6/2022 Song et al.
2022/0188672 A1 6/2022 Basch et al.
2022/0189238 A1 6/2022 Huke et al.
2022/0270432 A1 8/2022 Mendell et al.
2022/0351568 A1 11/2022 Smith
2022/0358808 A1 11/2022 Huke et al.
2022/0417603 A1 12/2022 Pleiman
2023/0011114 A1 1/2023 Guy et al.
2023/0082553 A1 3/2023 Mendell
2023/0124722 A1 * 4/2023 Polson ............... H04N 21/4781 725/37
2023/0162563 A1 5/2023 Turner
2023/0185579 A1 6/2023 Eranpurwala et al.
2023/0196871 A1 6/2023 Inamdar et al.
2023/0252848 A1 8/2023 Isgar
2023/0259714 A1 8/2023 Lange
2023/0267805 A1 8/2023 Edsall
2023/0350928 A1 11/2023 Hill et al.
2023/0351845 A1 11/2023 Mendell et al.
2023/0360488 A1 * 11/2023 Alyekhin ............ G07F 17/3288
2023/0360489 A1 11/2023 Alyekhin
2023/0360490 A1 11/2023 Alyekhin
2023/0360494 A1 11/2023 Alyekhin
2023/0394930 A1 * 12/2023 Shore .................. G07F 17/3237
2023/0410591 A1 12/2023 Monteverdi
2024/0029511 A1 1/2024 Teruuchi
2024/0086648 A1 3/2024 Han et al.
2024/0086773 A1 3/2024 Oppenheimer
2024/0105024 A1 3/2024 Huke et al.
2024/0282296 A1 8/2024 Bhathena et al.
2024/0290169 A1 8/2024 Inamdar et al.
2024/0312312 A1 9/2024 Flint
2024/0320510 A1 9/2024 Kundu et al.
2024/0346256 A1 10/2024 Qin
2024/0350924 A1 10/2024 Orlow
2024/0362409 A1 10/2024 Kuan
2024/0362968 A1 10/2024 Lyons et al.
2024/0362973 A1 * 10/2024 Owoyemi ........... G07F 17/3244
2024/0367054 A1 11/2024 Nelson et al.
2024/0378251 A1 11/2024 Boyd
2024/0378940 A1 11/2024 Latifi et al.
2024/0403845 A1 12/2024 O'Hanlon et al.
2024/0412058 A1 * 12/2024 Mayande .......... G06F 16/24564

(56) References Cited

U.S. PATENT DOCUMENTS

| | | | | |
|---|---|---|---|---|
| 2024/0428700 | A1 | 12/2024 | Asgekar et al. | |
| 2025/0046150 | A1 | 2/2025 | Huke et al. | |
| 2025/0077913 | A1 | 3/2025 | Vodeniktov et al. | |
| 2025/0086190 | A1 | 3/2025 | Azarmi | |
| 2025/0094143 | A1 | 3/2025 | Huang | |
| 2025/0094708 | A1 | 3/2025 | Cunningham et al. | |
| 2025/0095438 | A1 | 3/2025 | Russ et al. | |
| 2025/0103624 | A1 | 3/2025 | Carta et al. | |
| 2025/0118151 | A1 | 4/2025 | Williams | |
| 2025/0118156 | A1 | 4/2025 | Jovanovic | |
| 2025/0124063 | A1* | 4/2025 | Isslieb | G06F 16/335 |
| 2025/0124340 | A1 | 4/2025 | Ni et al. | |
| 2025/0140075 | A1 | 5/2025 | Groset et al. | |
| 2025/0157284 | A1 | 5/2025 | Wolfe et al. | |
| 2025/0161811 | A1 | 5/2025 | Assaad et al. | |
| 2025/0174083 | A1 | 5/2025 | Huke et al. | |
| 2025/0191437 | A1 | 6/2025 | Hanson et al. | |
| 2025/0191440 | A1 | 6/2025 | Bradley et al. | |
| 2025/0209891 | A1 | 6/2025 | Jacquet et al. | |
| 2025/0232126 | A1 | 7/2025 | Ma et al. | |
| 2025/0238449 | A1 | 7/2025 | Sharma et al. | |
| 2025/0265310 | A1 | 8/2025 | Barnes | |
| 2025/0278633 | A1 | 9/2025 | Smith et al. | |
| 2025/0291866 | A1* | 9/2025 | Park | G06F 16/632 |
| 2025/0294091 | A1 | 9/2025 | Mukherjee et al. | |
| 2025/0299053 | A1 | 9/2025 | Cuomo et al. | |
| 2025/0299536 | A1 | 9/2025 | Chun et al. | |
| 2025/0307302 | A1 | 10/2025 | Kolugur et al. | |
| 2025/0307572 | A1 | 10/2025 | Shtar et al. | |
| 2025/0307639 | A1 | 10/2025 | Jin et al. | |
| 2025/0316134 | A1 | 10/2025 | Vaccaro | |
| 2025/0316139 | A1* | 10/2025 | Vaccaro | G07F 17/323 |
| 2025/0316145 | A1* | 10/2025 | Merati | G07F 17/3223 |
| 2025/0322092 | A1 | 10/2025 | Troiani et al. | |
| 2025/0322168 | A1 | 10/2025 | Sharma | |
| 2025/0322295 | A1 | 10/2025 | Brin et al. | |
| 2025/0329218 | A1* | 10/2025 | Russ | G07F 17/3267 |
| 2025/0348580 | A1 | 11/2025 | Galinkin | |
| 2025/0355929 | A1 | 11/2025 | Lara Silva et al. | |
| 2025/0356725 | A1 | 11/2025 | Nowak | |
| 2025/0363856 | A1 | 11/2025 | Turner et al. | |
| 2025/0391250 | A1 | 12/2025 | Todisco et al. | |
| 2026/0024524 | A1 | 1/2026 | Perkins et al. | |

FOREIGN PATENT DOCUMENTS

| | | | |
|---|---|---|---|
| WO | WO-2023/140642 | A1 | 7/2023 |
| WO | WO-2024/194418 | A1 | 9/2024 |
| WO | WO-2025/019764 | A1 | 1/2025 |
| WO | WO-2025/042386 | A1 | 2/2025 |

OTHER PUBLICATIONS

Final Office Action on U.S. Appl. No. 19/357,902 DTD Feb. 9, 2026.
Final Office Action on U.S. Appl. No. 19/358,959 DTD Feb. 5, 2026.
Final Office Action on U.S. Appl. No. 19/359,438 DTD Apr. 2, 2026.
Final Office Action on U.S. Appl. No. 19/359,531 DTD Mar. 25, 2026.
Final Office Action on U.S. Appl. No. 19/360,328 DTD Feb. 26, 2026.
Final Office Action on U.S. Appl. No. 19/360,383 DTD Feb. 3, 2026.
Lee, et al., "Sportify: Question Answering with Embedded Visualizations and Personified Narratives for Sports Video," in arXiv preprint arXiv:2408.05123 (2024). (Year: 2024).
Non-Final Office Action on U.S. Appl. No. 19/357,856 DTD Jan. 2, 2026.
Non-Final Office Action on U.S. Appl. No. 19/357,889 DTD Jan. 12, 2026.
Non-Final Office Action on U.S. Appl. No. 19/357,902 DTD Dec. 16, 2025.
Non-Final Office Action on U.S. Appl. No. 19/357,918 DTD Jan. 13, 2026.
Non-Final Office Action on U.S. Appl. No. 19/357,967 DTD Jan. 28, 2026.
Non-Final Office Action on U.S. Appl. No. 19/358,916 DTD Jan. 28, 2026.
Non-Final Office Action on U.S. Appl. No. 19/358,919 DTD Dec. 23, 2025.
Non-Final Office Action on U.S. Appl. No. 19/358,959 DTD Dec. 2, 2025.
Non-Final Office Action on U.S. Appl. No. 19/359,002 DTD Jan. 13, 2026.
Non-Final Office Action on U.S. Appl. No. 19/359,036 DTD Jan. 13, 2026.
Non-Final Office Action on U.S. Appl. No. 19/359,438 DTD Dec. 19, 2025.
Non-Final Office Action on U.S. Appl. No. 19/359,531 DTD Dec. 12, 2025.
Non-Final Office Action on U.S. Appl. No. 19/359,534 DTD Dec. 11, 2025.
Non-Final Office Action on U.S. Appl. No. 19/360,020 DTD Jan. 14, 2026.
Non-Final Office Action on U.S. Appl. No. 19/360,307 DTD Jan. 20, 2026.
Non-Final Office Action on U.S. Appl. No. 19/360,328 DTD Dec. 11, 2025.
Non-Final Office Action on U.S. Appl. No. 19/360,368 DTD Jan. 28, 2026.
Non-Final Office Action on U.S. Appl. No. 19/360,383 DTD Dec. 15, 2025.
Non-Final Office Action on U.S. Appl. No. 19/360,512 DTD Dec. 30, 2025.
Non-Final Office Action on U.S. Appl. No. 19/360,597 DTD Jan. 30, 2026.
Non-Final Office Action on U.S. Appl. No. 19/360,809 DTD Jan. 14, 2026.
Non-Final Office Action on U.S. Appl. No. 19/360,880 DTD Dec. 31, 2025.
Non-Final Office Action on U.S. Appl. No. 19/360,886 DTD Feb. 19, 2026.
Non-Final Office Action on U.S. Appl. No. 19/360,886 DTD Dec. 8, 2025.
Non-Final Office Action on U.S. Appl. No. 19/360,892 DTD Jan. 13, 2026.
Notice of Allowance on U.S. Appl. No. 19/359,534 DTD Feb. 11, 2026.
Notice of Allowance on U.S. Appl. No. 19/360,873 DTD Jan. 26, 2026.
Schick et al., "Toolformer: Language Models Can Teach Themselves to Use Tools", Feb. 9, 2023, arXiv.com, pp. 1-17 (Year: 2023).
Structure Guided Prompt: Instructing Large Language Model in Multi-Step Reasoning by Exploring Graph Structure of the Text (Year: 2024).
Final Office Action on U.S. Appl. No. 19/357,856 DTD Apr. 21, 2026.
Final Office Action on U.S. Appl. No. 19/357,889 DTD Apr. 29, 2026.
Final Office Action on U.S. Appl. No. 19/358,919 DTD Apr. 21, 2026.
Final Office Action on U.S. Appl. No. 19/360,512 DTD Apr. 22, 2026.
Final Office Action on U.S. Appl. No. 19/360,597 DTD Jun. 5, 2026.
Final Office Action on U.S. Appl. No. 19/360,809 DTD May 1, 2026.
Final Office Action on U.S. Appl. No. 19/360,880 DTD Apr. 29, 2026.
Final Office Action on U.S. Appl. No. 19/360,892 DTD May 8, 2026.

(56) References Cited

OTHER PUBLICATIONS

Mohsenimofidi S, Prasad AS, Zahid A, Ra?q U, Wang X, Attal MI. Classifying user intent for effective prompt engineering: A case of a chatbot for startup teams. InGenerative Al for Effective Software Development Jun. 1, 2024 (pp. 317-329). Cham: Springer Nature Switzeriand. (Year: 2024).
Non-Final Office Action on U.S. Appl. No. 19/357,902 DTD Jul. 15, 2026.
Non-Final Office Action on U.S. Appl. No. 19/359,036 DTD May 11, 2026.
Non-Final Office Action on U.S. Appl. No. 19/359,948 DTD Jun. 17, 2026.
Non-Final Office Action on U.S. Appl. No. 19/360,030 DTD May 7, 2026.
Notice of Allowance on U.S. Appl. No. 19/358,916 DTD May 13, 2026.
Notice of Allowance on U.S. Appl. No. 19/358,959 DTD Jun. 26, 2026.
Notice of Allowance on U.S. Appl. No. 19/360,020 DTD Jun. 16, 2026.
Notice of Allowance on U.S. Appl. No. 19/360,307 DTD May 21, 2026.
Notice of Allowance on U.S. Appl. No. 19/360,383 DTD Apr. 17, 2026.

* cited by examiner

SYSTEMS AND METHODS FOR RESTRICTING NETWORK INTERACTIONS ACCORDING TO LANGUAGE MODEL OUTPUT

CROSS-REFERENCES TO RELATED APPLICATIONS

This application claims the benefit of and priority to U.S. Provisional Patent Application No. 63/741,297, filed Jan. 2, 2025; and claims the benefit of and priority to U.S. Provisional Patent Application No. 63/708,509, filed Oct. 17, 2024; and claims the benefit of and priority to U.S. Provisional Patent Application No. 63/708,492, filed Oct. 17, 2024; and claims the benefit of and priority to U.S. Provisional Patent Application No. 63/708,528, filed Oct. 17, 2024; and claims the benefit of and priority to U.S. Provisional Patent Application No. 63/708,542, filed Oct. 17, 2024; and claims the benefit of and priority to U.S. Provisional Patent Application No. 63/708,504, filed Oct. 17, 2024; and claims the benefit of and priority to U.S. Provisional Patent Application No. 63/711,415, filed Oct. 24, 2024; and claims the benefit of and priority to U.S. Provisional Patent Application No. 63/708,554, filed Oct. 17, 2024; and claims the benefit of and priority to U.S. Provisional Patent Application No. 63/719,406, filed Nov. 12, 2024; and claims the benefit of and priority to U.S. Provisional Patent Application No. 63/741,671, filed Jan. 3, 2025; the contents of each of which are incorporated herein by reference in their entireties for all purposes.

BACKGROUND

Network environments can support communication between multiple computing devices using techniques such as packet-switching. Data transmitted between devices can be synchronized such that multiple devices on the same network access the same information. However, it can be challenging to efficiently synchronize data transmission for graphical elements using conventional networking technology.

SUMMARY

At least one aspect of the present disclosure is directed to a system. The system can include one or more processors coupled to memory. The one or more processors may receive a first prompt for a communication session from a client device associated with a first player profile of a plurality of player profiles. The one or more processors may generate, using a language model and the first prompt, an output message indicating at least one restriction for wager opportunities to be included in the first player profile. The one or more processors may provide, during the communication session, the output message to the client device in response to the first prompt. The one or more processors may update the first player profile to include the at least one restriction in response to receiving an interaction corresponding to the output message from the client device. The one or more processors may receive, from the client device, a second prompt comprising a request for a wager opportunity. The one or more processors may determine that the request for the wager recommendation fails to satisfy the at least one restriction included in the first player profile. The one or more processors may provide a second output message to the client device indicating the at least one restriction.

In some implementations, the one or more processors may determine that the request fails to satisfy the at least one restriction based on an output of the language model. In some implementations, the one or more processors may select, based on the first prompt, the at least one restriction from a plurality of restrictions according to the first prompt. In some implementations, the first prompt can indicate the at least one restriction. In some implementations, the one or more processors may generate the output message to include a request for confirmation of the at least one restriction.

In some implementations, the first prompt can indicate a request for one or more restriction recommendations. In some implementations, the one or more processors may select, based on one or more historical wagers identified in the first player profile, the at least one restriction. In some implementations, the one or more processors may generate the output message to include the at least one restriction and an indication corresponding to the one or more historical wagers. In some implementations, the one or more processors may classify an intent of the first prompt as indicating the request for the one or more restriction recommendations. In some implementations, the one or more processors may generate the output message responsive to the intent of the first prompt being classified as indicating the request for the one or more restriction recommendations.

In some implementations, the one or more processors may determine, based on the first prompt, that at least one restriction recommendation criteria is satisfied. In some implementations, the one or more processors may generate the output message responsive to determining that the at least one restriction recommendation criteria is satisfied. In some implementations, the one or more processors may provide the output message to the client device responsive to determining that the at least one restriction recommendation criteria is satisfied.

In some implementations, the one or more processors may receive, from the client device, a third prompt indicating a request to revoke the at least one restriction of the first player profile. In some implementations, the one or more processors may generate, using the language model and based on the third prompt, a command to revoke the at least one restriction. In some implementations, the at least one restriction can include one or more of a wager amount restriction, a time restriction for wagers, a frequency restriction for wagers, an odds restriction for wagers, or a wager type restriction.

At least one aspect of the present disclosure is directed to a method of a system. The method may include receiving a first prompt for a communication session from a client device associated with a first player profile of a plurality of player profiles. The method may include generating, using a language model and the first prompt, an output message indicating at least one restriction for wager opportunities to be included in the first player profile. The method may include providing, during the communication session, the output message to the client device in response to the first prompt. The method may include updating the first player profile to include the at least one restriction in response to receiving an interaction corresponding to the output message from the client device. The method may include receiving, from the client device, a second prompt comprising a request for a wager opportunity. The method may include determining that the request for the wager recommendation fails to satisfy the at least one restriction included in the first player profile. The method may include providing a second output message to the client device indicating the at least one restriction.

In some implementations, the method may include determining that the request fails to satisfy the at least one restriction based on an output of the language model. In some implementations, the method may include selecting, based on the first prompt, the at least one restriction from a plurality of restrictions according to the first prompt. In some implementations, the first prompt can indicate the at least one restriction. In some implementations, the method may include generating the output message to include a request for confirmation of the at least one restriction.

In some implementations, the first prompt can indicate a request for one or more restriction recommendations. In some implementations, the method may include selecting, based on one or more historical wagers identified in the first player profile, the at least one restriction. In some implementations, the method may include generating the output message to include the at least one restriction and an indication corresponding to the one or more historical wagers. In some implementations, the method may include classifying an intent of the first prompt as indicating the request for the one or more restriction recommendations. In some implementations, the method may include generating the output message responsive to the intent of the first prompt being classified as indicating the request for the one or more restriction recommendations.

In some implementations, the method may include determining, based on the first prompt, that at least one restriction recommendation criteria is satisfied. In some implementations, the method may include generating the output message responsive to determining that the at least one restriction recommendation criteria is satisfied. In some implementations, the method may include providing the output message to the client device responsive to determining that the at least one restriction recommendation criteria is satisfied.

In some implementations, the method may include receiving, from the client device, a third prompt indicating a request to revoke the at least one restriction of the first player profile. In some implementations, the method may include generating, using the language model and based on the third prompt, a command to revoke the at least one restriction. In some implementations, the at least one restriction can include one or more of a wager amount restriction, a time restriction for wagers, a frequency restriction for wagers, an odds restriction for wagers, or a wager type restriction.

At least one aspect of the present disclosure is directed to a system. The system can include one or more processors coupled to memory. The one or more processors may receive a prompt for a communication session from a client device associated with a first player profile of a plurality of player profiles. The one or more processors may generate, using a language model and the prompt, an output message indicating a set of values for generation of a wager opportunity. The one or more processors may generate, using the set of values, the wager opportunity corresponding to the set of values, the wager opportunity comprising a set of wager attributes. The one or more processors may determine, based on the set of wager attributes, that the wager opportunity fails to satisfy at least one restriction for generated wager opportunities. The one or more processors may generate, using the language model and the set of wager attributes, a second output message indicating the wager opportunity fails to satisfy the at least one restriction. The one or more processors may provide the second output message to the client device in response to the prompt.

In some implementations, the wager opportunity can include a parlay wager opportunity. In some implementations, the one or more processors may receive an indication of at least two legs for the parlay wager opportunity in the prompt. In some implementations, the one or more processors may generate the output message to include a data structure identifying data for each of the at least two legs for the parlay wager opportunity. In some implementations, the one or more processors may determine an odds value for the parlay wager opportunity based on respective odds values of each leg of the parlay wager opportunity. In some implementations, the one or more processors may determine that the wager opportunity fails to satisfy the at least one restriction based on the odds value exceeding a threshold of the at least one restriction.

In some implementations, the one or more processors may identify the at least one restriction from the first player profile. In some implementations, the set of wager attributes of the wager opportunity can correspond to a first wager type. In some implementations, the one or more processors may select the at least one restriction from a plurality of restrictions based on the first wager type. In some implementations, the one or more processors may generate an input context for the language model using the set of wager attributes of the wager opportunity and the at least one restriction. In some implementations, the set of wager attributes can include a time of the wager opportunity, an odds value of the wager opportunity, or a wager type of the wager opportunity.

In some implementations, the at least one restriction can include a restriction for a threshold number of wagers within a time period. In some implementations, the one or more processors may determine, based on the first player profile, responsive to generating the wager opportunity, that the threshold number of wagers placed using the first player profile within the time period is exceeded. In some implementations, the one or more processors may generate the second output message to include an indication that the threshold number of wagers within the time period is exceeded. In some implementations, the one or more processors may provide the second output message to the client device responsive to determining that the threshold number of wagers placed using the first player profile within the time period is exceeded.

At least one aspect of the present disclosure is directed to a method of a system. The method may include receiving a prompt for a communication session from a client device associated with a first player profile of a plurality of player profiles. The method may include generating, using a language model and the prompt, an output message indicating a set of values for generation of a wager opportunity. The method may include generating, using the set of values, the wager opportunity corresponding to the set of values, the wager opportunity comprising a set of wager attributes. The method may include determining, based on the set of wager attributes, that the wager opportunity fails to satisfy at least one restriction for generated wager opportunities. The method may include generating, using the language model and the set of wager attributes, a second output message indicating the wager opportunity fails to satisfy the at least one restriction. The method may include providing the second output message to the client device in response to the prompt.

In some implementations, the wager opportunity can include a parlay wager opportunity. In some implementations, the method may include receiving an indication of at least two legs for the parlay wager opportunity in the prompt. In some implementations, the method may include generating the output message to include a data structure identifying data for each of the at least two legs for the parlay wager opportunity. In some implementations, the method may include determining an odds value for the parlay wager opportunity based on respective odds values of each leg of the parlay wager opportunity. In some implementations, the method may include determining that the wager opportunity fails to satisfy the at least one restriction based on the odds value exceeding a threshold of the at least one restriction.

In some implementations, the method may include identifying the at least one restriction from the first player profile. In some implementations, the set of wager attributes of the wager opportunity can correspond to a first wager type. In some implementations, the method may include selecting the at least one restriction from a plurality of restrictions based on the first wager type. In some implementations, the method may include generating an input context for the language model using the set of wager attributes of the wager opportunity and the at least one restriction.

In some implementations, the set of wager attributes can include a time of the wager opportunity, an odds value of the wager opportunity, or a wager type of the wager opportunity. In some implementations, the at least one restriction can include a restriction for a threshold number of wagers within a time period. In some implementations, the method may include determining, based on the first player profile, responsive to generating the wager opportunity, that the threshold number of wagers placed using the first player profile within the time period is exceeded. In some implementations, the method may include generating the second output message to include an indication that the threshold number of wagers within the time period is exceeded. In some implementations, the method may include providing the second output message to the client device responsive to determining that the threshold number of wagers placed using the first player profile within the time period is exceeded.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form. For example, by appropriate computer programs, which may be carried on appropriate carrier media (e.g., computer readable media), which may be tangible carrier media (e.g., disks) or intangible carrier media (e.g., communications signals). Aspects may also be implemented using suitable apparatuses, which may take the form of programmable computers running computer programs arranged to implement the aspect. As used in the specification and in the claims, the singular form of "a", "an", and "the" include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
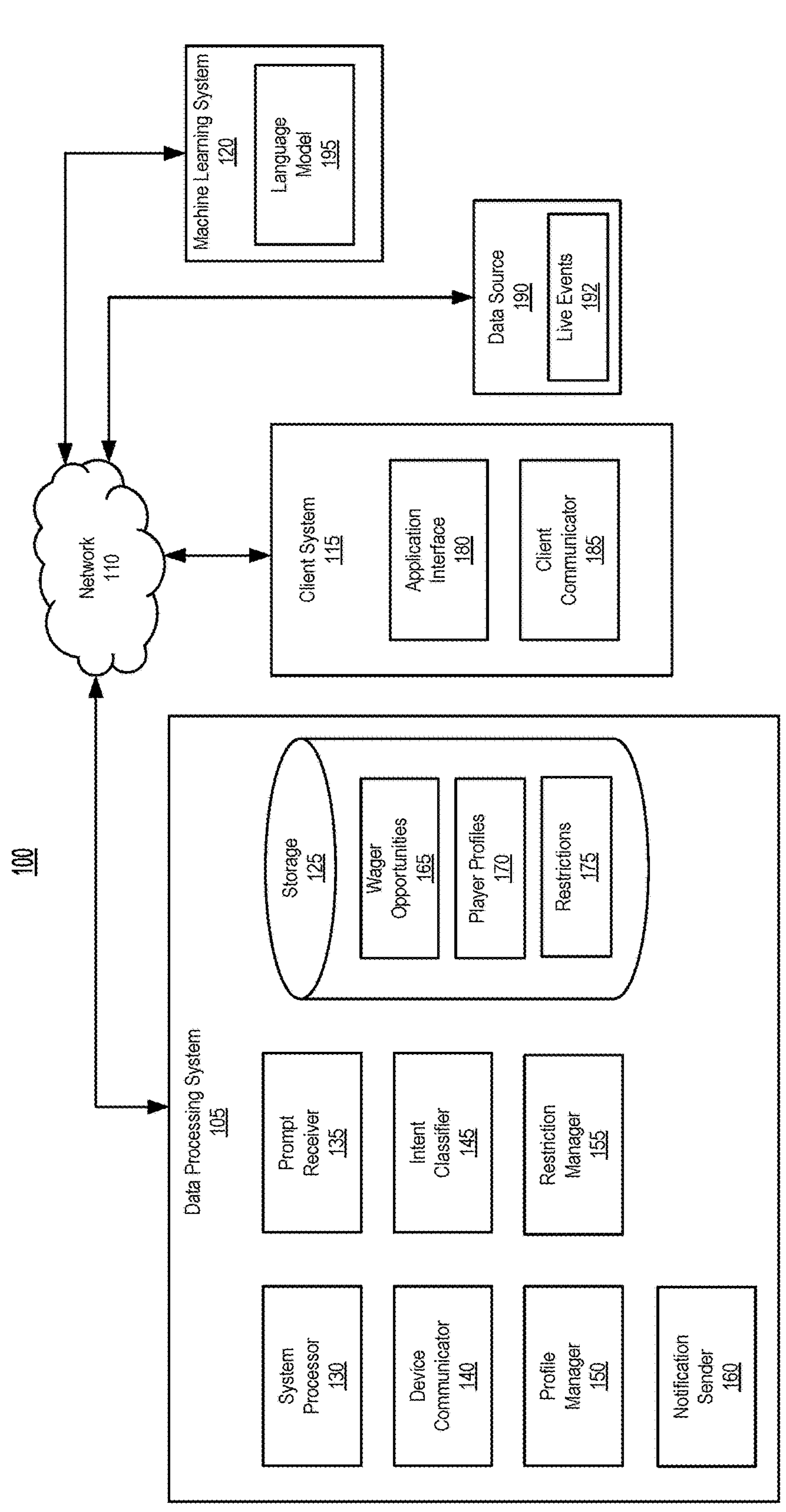
FIG. 1 illustrates a block diagram of an example system for providing machine-learning system functionalities, in accordance with one or more implementations.

Below are detailed descriptions of various concepts related to, and implementations of, techniques, approaches, methods, apparatuses, and systems for providing interactive game experiences. The various concepts introduced above and discussed in greater detail below may be implemented in any of numerous ways, as the described concepts are not limited to any particular manner of implementation. Examples of specific implementations and applications are provided primarily for illustrative purposes.

In various implementations, the systems and methods described can generate restrictions for network interactions using language models trained on input from distributed computing environments. The technical solutions can implement a hardware architecture configured to accelerate language model computations for optimizing network operations. The hardware architecture can include custom neural network accelerators or optimized memory subsystems to manage the intensive computational demands of processing inputs related to wager restrictions for responsible gaming and other optimization parameters. The technical solutions can incorporate a hybrid approach that combines rule-based systems, such as knowledge graphs or template matching algorithms, with neural networks. For example, rule-based systems can be used to maintain consistency in restriction recommendations and prevent the generation of contradictory or nonsensical outputs in complex distributed environments.

Natural language processing techniques can be applied across a wide range of computing environments to generate responses or other outputs based on natural language prompts. Language models and other machine-learning models can be used in various applications, including but not limited real-time information retrieval interfaces, which can be limited according to processing capacity of the systems executing such machine-learning models. To perform such operations, a language model can process input data sequences that represent prompts, contextual information, and other relevant data.

As language models typically include a large number of parameters, invoking such language models typically requires significant processing resources that make language models challenging to use for certain applications (e.g., real-time or near real-time applications. The number of operations and the amount of memory used to process a prompt is generally influenced by the size of the input context provided to the language model. Input contexts can include historical exchanges, metadata, and/or external reference information that may be relevant to generating an accurate or contextually suitable output. Generating suitable outputs typically involves providing large amounts of information as input to language models, which can significantly hinder performance, both in terms of accuracy and execution performance (e.g., computing resource utilization).

Conventional techniques for supplying input contexts to language models fail to ameliorate these issues. For example, conventional approaches often require sending large contexts, which often include an entire accumulated input, across multiple requests to achieve a requested output. Increasing the size of the input context results in increased network latency and bandwidth consumption. During output generation, executing language models with large input contexts causes processor load and increased memory allocation that grow at rates that reduce the feasibility of using language model in many real-time or near real-time applications. As a result, existing systems experience limited throughput, excessive memory consumption, and elevated network resource usage.

The techniques described herein address these and other issues by generating targeted input contexts for a language model that include only data determined to be relevant to a given prompt. In general, the techniques can select prompt-specific subsets of available context data based on one or more classification processes and/or rule-based policies. By constructing an input context from only the selected subset, the techniques described herein can significantly reduce the processing resources needed to process the input context without omitting information that is pertinent to generating an accurate output. Such context selection operations can be perform in connection with session-based data persistence, such that follow-on prompts can be processed according to previously stored interaction data, in some implementations.

By selectively reducing the contents of an input context based on prompt relevance and by avoiding redundant transmission of static context data, the techniques described herein can lower processing time and memory requirements for language model execution. Network bandwidth consumption can also be reduced because only incremental or newly relevant data is transmitted for follow-on prompts, rather than the entire accumulated context. These improvements can provide faster response times for multi-turn interactions, sustain throughput in high-load scenarios, and enable the use of large-scale language models within low-latency applications where conventional approaches would exceed performance constraints.

In further detail, various implementations of the systems and methods described herein can be used to reduce processor utilization and memory consumption when processing prompts with additional contextual input via one or more language models or other machine-learning models. For example, a system can maintain one or more data structures storing specific information that can be automatically selected for inclusion in an input context of the language/machine-learning models. As noted above, the computing resources (e.g., computing time and/or memory/caching consumption) used to execute language models or other natural language processing functions on computers increase at least quadratically with the size of the input context (e.g., the input data to be processed). Executing language models using existing techniques therefore restricts the context size according to the expected/target processing time of a corresponding request. For real-time or near real-time applications, such extended delays make using language models impossible to use.

To address these challenges, the systems and methods described herein can dynamically generate an input context that includes a subset of data that can be used to carry out requested computing operations. Such automatic selection may be performed, for example, according to intent classification operations executed using additional machine-learning models and/or specific rules-based selection policies. By automatically selecting certain data to be included in the input context, the systems and methods described herein automatically limit the input context for the language model to a targeted subset of available data, thereby reducing the latency (e.g., processing time) and memory allocation required to carry out the requested operations using the language model. As a result, the systems and methods described herein operate more efficiently, and allow for the use of language models in real-time or near real-time processing applications, which would otherwise be impossible to implement using existing techniques.

In various implementations, the technical solutions can implement various approaches that improve upon conventional techniques, including dynamic updating of databases indicating definition data and/or context information, as well as dynamic training/fine-tuning/updating of language model parameters, to facilitate the processing of various input prompts to generate commands for the computing system to automatically enforce restrictions related to network interactions, including wager amount restrictions, time restrictions, frequency restrictions, odds restrictions, or wager type restrictions. The technical solutions can dynamically update language model parameters to improve the language model's ability to accurately process prompts, generate restrictions, and cause the computing system to automatically enforce these restrictions in real-time or near real-time.

The technical solutions described herein can address the challenge of hallucinations in the language model outputs, where the model generates responses that are plausible but incorrect. For example, by generating improved input contexts with particular data from up-to-date data sources using structured input, the systems and methods described herein can reduce the likelihood of hallucinatory responses from the language model and enhance the generation of commands that cause the computing system to enforce restrictions related to network interactions. Some implementations described herein can perform additional training and fine-tuning processes that update the language models to adapt to new data and correct any inaccuracies in their responses. Unlike conventional approaches, which fail to produce accurate and consistent language model output, the techniques described herein can process data for the language models to reduce instances of hallucinations and increase output precision and accuracy.

The techniques described herein include features and functionalities relating to improved machine learning for processing prompt data and generating and automatically enforcing restrictions for network interactions. For purposes of reading the descriptions of the various implementations below, the following descriptions of the sections of the Specification and their respective contents may be helpful:

I. Section A describes a remote or local computing environment that may be useful for providing machine-learning system functionalities.

II. Section B describes systems and methods for generating restrictions for network interactions according to language model output.
III. Section C describes systems and methods for automatically enforcing restrictions for network interactions using language models.
IV. Section D describes a computing and networking environment that may be useful for practicing the implementations described herein.

A. Remote or Local Computing Environment for Providing Machine-Learning System Functionalities Referring to FIG. 1, depicted is a block diagram of an example system 100 for network interactions using language models. In FIG. 1, the system 100 can include at least one data processing system 105, at least one network 110, at least one client system 115, at least one machine learning system 120, and at least one data source 190. The data processing system 105 can include at least one storage 125, at least one system processor 130, at least one prompt receiver 135, at least one device communicator 140, at least one intent classifier 145, at least one profile manager 150, at least one restriction manager 155, and at least one notification sender 160. The storage 125 can include one or more wager opportunities 165, one or more player profiles 170, and one or more restrictions 175. The client system 115 can include at least one application interface 180 and at least one client communicator 185. The machine learning system 120 can include at least one language model 195. The data source 190 can include up-to-date information relating to one or more live events 192 and may be external to the data processing system 105, as shown.

The data processing system 105 can include a physical computer system operatively coupled with one or more components of the system 100. The data processing system 105 can include a cloud system, a server, a distributed remote system, or any combination thereof. The data processing system 105 can include a virtual computing system, an operating system, and a communication bus to effect communication and processing. The data processing system 105 can include physical infrastructure, such as physical servers, storage devices, and network equipment housed in data centers. The data processing system 105 can include a virtual computing system, which can include cloud-based virtual machines or containers for running applications and services. The data processing system 105 can include an operating system that can function as the core manager, allocating resources, configuring processes, and facilitating interaction between hardware and applications. The data processing system 105 can include a communication bus that can facilitate communication between different components within the system. The data processing system 105 can connect with external systems to allow for data exchange and service delivery to end users.

The client system 115 (sometimes referred to as a "client device 115") can include a computing system that can be used to access the functionality of the data processing system 105. The client system 115 can include a smart phone, mobile device, laptop computer, desktop computer, one or more servers, or any other type of computing device. The client system 115 can include at least one processor and a memory, e.g., a processing circuit. The memory can store processor-executable instructions that, when executed by the processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language.

The client system 115 can include one or more devices to receive input from a user and/or to provide output to a user. For example, the output capabilities of the application interface 180 can be presented by a display device that provides visual feedback to the user. The display device can enhance the user experience with electronic displays, such as liquid crystal displays (LCD), light-emitting diode (LED) displays, or organic light-emitting diode (OLED) displays. The electronic displays can implement interactive features, including capacitive or resistive touch input, allowing for multi-touch functionality. The input functionalities can include a keyboard, mouse, or an integrated touch-sensitive panel on the display device, but are not limited thereto.

The machine learning system 120 can include one or more machine learning models 195 trained on datasets. The machine learning system 120 can include a cloud system, a server, a distributed remote system, or any combination thereof. The machine learning system 120 can include, but is not limited to including, at least a central processing unit (CPU), a graphics processing unit (GPU), a tensor processing unit (TPU), or the like. The machine learning system 120 can include a memory operable to store one or more instructions for operating components of the machine learning system 120 and operating components operably coupled to the machine learning system 120. For example, the instructions can include firmware, software, hardware, operating systems, or embedded operating systems, among others. The machine learning system 120 can be internal to the data processing system 105. The machine learning system 120 can exist external to the data processing system 105 and can be accessed via the network 110. In some implementations, the machine learning system 120 implements or otherwise provides access to one or more application programming interfaces (APIs), via which the data processing system 105 and/or the client system 115 can access the language model 195 or other functionality of the machine learning system 120.

The network 110 can include computer networks such as the Internet, local, wide, metro, or other area networks, intranets, satellite networks, other computer networks such as voice or data mobile phone communication networks, and combinations thereof. The data processing system 105 of the system 100 can establish a communication session via the network 110, for example, with the client systems 115 and/or the machine learning system 120. Establishing a communication session can refer to creating a temporary connection between two or more devices to exchange information. For example, this can include setting up a data exchange session between the client system 115 and the data processing system 105. The network 110 may be any form of computer network that can relay information between the data processing system 105, the client system 115, the machine learning system 120, and one or more information sources, such as web servers or external databases, amongst others.

The network 110 can include the Internet and/or other types of data networks, such as a local area network (LAN), a wide area network (WAN), a cellular network, a satellite network, or other types of data networks. The network 110 can include any number of computing devices (e.g., computers, servers, routers, network switches, etc.) that are configured to receive and/or transmit data within the network 110. The network 110 can further include any number of hardwired and/or wireless connections. Any or all of the computing devices described herein (e.g., the data processing system 105, the client system 115, the machine learning system 120, etc.) can communicate wirelessly (e.g., via Wi-Fi, cellular, radio, etc.) with a transceiver that is hardwired (e.g., via a fiber optic cable, a CAT5 cable, etc.) to other computing devices in the network 110. Any or all of the computing devices described herein can communicate wirelessly with the computing devices of the network 110 via a proxy device (e.g., a router, network switch, or gateway).

The system 100 is shown as including the data source 190, which can be accessible via the network 110. The data source 190 can be a computing system, server, data repository, or any other source of data that can store, provide, or otherwise maintain any of the information relating to live events 192 described herein. In some implementations, the data source 190 can include hardware, software, or any combination thereof. The data source 190 can include information used to inform betting decisions, such as odds values for wager opportunities 165 as well as information relating to the outcomes for different wager opportunities 165. In some implementations, the data source 190 can include one or more components to facilitate data collection, processing, storage, and delivery, among others. For example, the data source 190 can include APIs and web scrapers to collect data from various sources, such as official sports league websites, betting platforms, and third-party data providers. In some implementations, the data source 190 can be or include one or more computing systems of third-party data providers, such as official sports league websites, or betting platforms, among others.

In some implementations, the data source 190 can include and provide real-time or near real-time data feeds that provide live updates on scores, player statistics, and other relevant metrics tied to live events 192. The live event 192 can correspond to a specific ongoing sporting event and can include an identifier that allows the data source 190 to continuously monitor and update relevant data, including event progression, player performance, and associated wagering opportunities. The live event identifier can be used as a reference point, such that the data source 190 can accurately associate updates with the correct live event 192. The live event identifier can be assigned when a sporting event is scheduled and can be based on factors such as the league or tournament to which the event belongs, the event's date and time, the participating teams or players, and the venue where the event is held. The data source 190 can include and/or integrate with sports leagues or infrastructures to receive live data feeds, which can include/provide the event identifier for each game. The live data feeds can provide the data source 190 with continuous updates tied to the live event 192, such that the data can be properly categorized and monitored in real-time or near real-time. The data source 190 can store the live event identifiers along with related data such as scores, player statistics, and other metrics, allowing for seamless updates and accurate tracking of wagering opportunities as the live event 192 progresses. The data processing system 105 can access any of the information provided/maintained by the data source 190 via the network 110. In some implementations, the data source 190 can be internal to, or may otherwise be a component of, the data processing system 105.

The data processing system 105 can include the storage 125. The storage 125 can be a computer-readable memory that can store or maintain any of the information described herein. The storage 125 can store data associated with the system 100. The storage 125 can include one or more hardware memory devices to store binary data, digital data, or the like. The storage 125 can include one or more electrical components, electronic components, programmable electronic components, reprogrammable electronic components, integrated circuits, semiconductor devices, flip flops, arithmetic units, or the like. The storage 125 can include at least one of a non-volatile memory device, a solid-state memory device, a flash memory device, or a NAND memory device. The storage 125 can include one or more addressable memory regions disposed on one or more physical memory arrays. A physical memory array can include a NAND gate array disposed on, for example, at least one of a particular semiconductor device, an integrated circuit device, or a printed circuit board device. In an aspect, the storage 125 can correspond to a non-transitory computer readable medium. In an aspect, the non-transitory computer readable medium can include one or more instructions executable by the system processor 130.

In some implementations, the storage 125 can store, modify, or otherwise maintain any of the information described herein using one or more databases. The storage 125 can be accessed using one or more memory addresses, index values, or identifiers of any item, structure, or region maintained in the storage 125. The storage 125 can be accessed by the components of the data processing system 105, the client system 115, the machine learning system 120, or any other computing device described herein, via the network 110. The storage 125 can be internal to the data processing system 105. The storage 125 can exist externally to the data processing system 105 and can be accessed via the network 110. For example, the storage 125 can be distributed across many different computer systems (e.g., a cloud computing system) or storage elements and may be accessed via the network 110 or a suitable computer bus interface.

The data processing system 105, the client system 115, or the machine learning system 120 can store in the storage 125 the results of any or all computations, determinations, selections, identifications, generations, constructions, or calculations in one or more data structures indexed or identified with appropriate values. Any or all values stored in the storage 125 can be accessed by any computing device described herein, such as the data processing system 105, the client system 115, or the machine learning system 120, to perform any of the functionalities or functions described herein. In implementations where the storage 125 forms a part of a cloud computing system, the storage 125 can be a distributed storage medium in a cloud computing system and can be accessed by any of the components of the data processing system 105, the client system 115, the machine learning system 120, or by any other computing devices described herein.

The storage 125 can store wager opportunities 165 for one or more past, current, or future events. The wager opportunities 165 can include event information, identifying the specific event each wager is tied to, such as team names, game details, etc. The wager opportunities 165 can include wager options, including different types of bets available for each event, such as moneyline, point spread, or over/under, among other markets. The wager opportunities 165 can include odds, for example, the payout ratio associated with each wager and how much a winning wager returned. The wager opportunities 165 can include an indication of a wager recommendation. For example, the wager opportunities 165 can include an indication of a parlay or a single bet recommendation. In some implementations, the wager opportunities 165 can include flags or markers indicating whether a wager is a parlay or a single bet, for instance. The wager opportunities 165 can include a record of the number of wagers placed.

In some embodiments, the wager opportunities 165 can include data corresponding to historical wager opportunities. The historical wager opportunities can correspond to past wagering opportunities. For example, the historical wager opportunities can include details about the wagers placed on past games, such as the types of wagers, the odds offered, the outcomes of those wagers, and the volume of wagers made on specific events or outcomes. The wager opportunities 165 can be used to calculate or adjust the odds associated with the current wager opportunities. In some implementations, odds associated with wager opportunities 165 can be dynamically adjusted based on various factors, such as live event data/developments, fluctuations in betting volume, and historical wager patterns, among others. In some implementations, upon detecting events, such as scores, timeouts, updates to bet slips, wagers added or removed, or legs added or removed, the data processing system 105 can recalculate and adjust wager odds. In some implementations, the data processing system 105 can track the popularity of specific wager types or specific wager opportunities, such as single game parlays, quick single game parlays (Quick SGPs), by tracking the number of times the corresponding wager types/opportunities have been selected. For example, each wager opportunity 165 can include or be associated with a counter that is incremented each time the wager opportunity is selected by a player via the data processing system 105. In some implementations, based on prompts and betting trends, the data processing system 105 can categorize or flag wager opportunities 165 as components or legs of parlay wagers.

The storage 125 can store one or more player profiles 170 associated with a user (sometimes referred to herein as a "player") of a client system 115. A player profile 170 of a player can be a user profile that includes information about the player and information about one or more of the client systems 115 used to access the data processing system 105 using the player profile 170. For example, identifiers of the player profile 170 can be used to access the functionality of the data processing system 105 (e.g., by logging into the data processing system 105 via one or more web-based interfaces). The identifiers can include a username, a password, an e-mail address, a phone number, a personal identification number (PIN), a secret code-word, and device identifiers for use in a two-factor authentication technique, among others. The player profile 170 can store information about wagers, games, and live events that are performed by the player via the data processing system 105.

The player profile 170 can store a credit balance, wager information, or side wager information (e.g., an amount of a wager/side wager, a timestamp associated with a wager/side wager, information about gaming conditions or game state information that resulted in a side wager, a client system identifier of the client system 115 that was used to place the wager/side wager, etc.). The player profile 170 can store information about the client system 115 used to access the data processing system 105, such as an IP address, a MAC address, a GUID, a player profile name (e.g., the name of a user of the client system, etc.), and a device name, among others. In some implementations, the player profile 170 can be generated by the data processing system 105 in response to the player profile generation request transmitted by the client system 115 associated with a client device. The player profile generation request can include any of the player profile information described herein.

The storage 125 can include one or more restrictions 175 for wager opportunities 165. The restrictions 175 can be stored in or in association with the player profile 170. For example, the player profile 170 can store a player's betting history, preferences, and limits on specific wager types. In some implementations, the restrictions 175 can be restrictions for the odds value of a potential wager. For example, the restrictions 175 can limit bets on high-risk wagers with low odds of a favorable outcome. In some implementations, the restrictions 175 can set wager limits to restrict the maximum amount wagered. In some implementations, the restrictions 175 can be applied to limit wager activity to a threshold number of wagers within a specific time period to restrict/limit high-frequency betting. The restrictions 175 can impose time limits to control the durations or time periods that a player can bet. Applying such restrictions 175 can include transmitting automated notifications based on predefined betting durations to inform players of their ongoing betting activity, such as when the player approaches a predetermined wager limit or time limit. In some implementations, the restrictions 175 can be used to control or regulate betting activity based on a player's geographic location, such as prohibiting certain types of wagers in specific regions.

In some implementations, the storage 125 can store personalized recommendations or restrictions 175 generated by the language model 195. The profile manager 150 can manage data associated with the player profile 170, such as player's betting history, preferences, or risk tolerance, which can include wager types, bet amounts, win/loss records, and time spent gambling, among others. The language model 195 can evaluate the data, for example, via pattern recognition, statistical analysis, or comparison to industry benchmarks to identify potential gambling risks. Based on the evaluation, the language model 195 can generate recommendations for restrictions, such as deposit limits to cap the amount a player can deposit, loss limits to control the player's maximum losses, time limits to reduce gambling hours, temporary account blocks for the player profile, or self-exclusion options for taking a break from gambling.

In some implementations, the player profiles 170 can manually specify their wager restrictions 175. For example, players can access their account settings to adjust parameters, such as deposit limits, loss limits, time limits, or self-exclusion options. In some implementations, players can directly input specific restriction values, defining daily, weekly wager limits, or other desired restrictions. The application interface 180 can provide interactive tools that allow players to visualize and modify the restrictions 175 associated with the player profile 170.

In some implementations, the data processing system 105 can automatically impose restrictions 175 on players if the data processing system 105 detects signs of irresponsible gaming behavior, such as excessive spending or chasing losses. The data processing system 105, via the profile manager 150, can collect data on player behavior, including wager history, time spent gambling, or deposit/withdrawal amounts. For example, the data processing system 105 can compare the collected data associated with the player profile 170 to predefined thresholds such as loss limits, time limits, wager frequency, or deposit limits. When a threshold is exceeded, the data processing system 105 can automatically apply the corresponding restrictions 175. For example, if a player exceeds their daily loss limit, the data processing system 105 can temporarily suspend their account or limit their wagering options.

The data processing system 105 can include the system processor 130. The system processor 130 can execute one or more instructions associated with the data processing system 105. The system processor 130 can include an electronic processor, an integrated circuit, or the like, including one or more of digital logic, analog logic, digital sensors, analog sensors, communication buses, volatile memory, nonvolatile memory, and the like. The system processor 130 can include, but is not limited to, at least one central processing unit (CPU), graphics processing unit (GPU), physics processing unit (PPU), tensor processing unit (TPU), embedded controller (EC), or the like. The system processor 130 can include a memory operable to store or storing one or more instructions for operating components of the system processor 130 and operating components operably coupled to the system processor 130. For example, the one or more instructions can include one or more of firmware, software, hardware, operating systems, or embedded operating systems. The system processor 130 or the data processing system 105 can include one or more communication bus controllers to effect communication between the system processor 130 and the other elements of the data processing system 105.

The data processing system 105 can include the prompt receiver 135. The prompt receiver 135 can be or include any script, file, program, application, set of instructions, or computer-executable code that is configured to process input data in the form of a prompt. The prompt receiver 135 can include hardware, software, or any combination thereof. A prompt can include any user-provided command, request, or text data. The prompt can include a request or information relating to bet placement, such as an indication of a wager type, a wager amount, selecting specific live events, or determining specific outcomes. The prompt receiver 135 can receive the prompt from the client system 115 in natural language (e.g., a text string). The prompt receiver 135 can receive prompts through user interactions with the application interface 180. User interactions can include clicking buttons, entering text, or using voice commands within one or more application interfaces 180, among others. In some implementations, the prompt receiver 135 can expose an API endpoint, allowing other applications or systems to send prompts in structured formats such as JSON or XML. In some implementations, the prompt receiver 135 can subscribe to a message queue where prompts are published by other components/devices of the system 100, for example, according to a publisher-subscriber communication protocol. In some implementations, the prompt receiver 135 can identify specific events or triggers, such as user actions or system state changes, which can generate prompts. In some implementations, the prompt receiver 135 can process prompts loaded from files stored on the data processing system 105.

The prompt receiver 135 can receive a prompt for a communication session from a client device 115 associated with a player profile 170. For example, the prompt receiver 135 can receive prompts through the client device 115, such as via a mobile app or website. The prompt can include information about the desired wager, including the wager type (e.g., parlays, moneyline, point spread), the amount the player wants to wager, or the odds associated with the wager, among others. In some implementations, prompts can include specific parameters or flags that indicate one or more restrictions. For example, the prompt can include a parameter specifying a maximum wager amount allowed (e.g., wager amount restriction). The prompt can specify a start and end time for current or future wagering requests (e.g., time restriction for wagers). The prompt can specify a maximum number of wagers allowed within a certain timeframe (e.g., frequency restriction for wagers) or a minimum or maximum odds value for acceptable wagers (e.g., odds restriction for wagers). The prompt can specify allowed or prohibited wager types (e.g., wager type restriction).

In some implementations, prompts can indicate a request for one or more restriction recommendations. The prompt can include flags or parameters to indicate such a request. For example, the prompt can specify a particular betting parameter where the player desires recommendations, such as “suggest deposit limits” or “recommend time restrictions”. In some implementations, the prompt can request one or more types of restrictions 175 or restriction recommendations. In some implementations, prompts can request the removal or revocation of existing restrictions on a player profile 170 to allow players to modify their preferences and wagering restrictions as desired. The prompt can include specific flags or parameters indicating a request for restriction revocation. For example, the prompt can specify the restriction to be revoked, such as “revoke deposit limit” or “revoke time limit”. In some implementations, the prompt can request the removal of multiple restrictions simultaneously.

In some implementations, the prompt receiver 135 can parse and process prompts to extract information such as wager type, amount, restrictions associated with wager opportunities, and game selections, among others. The prompt receiver 135 can execute functions based on the content of the prompt. For example, the prompt receiver 135 can validate the requested wager against betting odds or predefined restrictions 175. In some implementations, the prompt receiver 135 can validate the sufficiency of the user’s account balance via the profile manager 150 or confirm that the bet timing complies with any applicable restrictions 175. The prompt receiver 135 can facilitate the transmission of the wager to the service provider’s backend, where the wager is logged and acted upon. In some implementations, the prompt receiver 135 can collect and store records of user prompts (and, in some implementations, conversation records including corresponding responses) in the storage 125 as part of one or more training examples to improve the accuracy of the language model 195. The prompt receiver 135 can manage multiple prompts and address a wide variety of user queries related to restrictions 175 or wager opportunities 165. In some implementations, such approaches may be performed by the intent classifier 145 and/or other components of the data processing system 105.

In some implementations, the prompt receiver 135 can receive prompts for the language model 195 and parse them to extract information related to wager opportunities 165, such as parlay wagers in this example. The prompt receiver 135 can identify and extract components of the prompt related to multiple legs of a parlay wager opportunity. For example, when the data processing system 105 receives a prompt such as “Give me a wager on the Thunderbolts winning their game and covering the spread”, the prompt receiver 135 can identify the two legs of the parlay wager (e.g., the Thunderbolts winning the game and covering the spread) and process the prompt accordingly. In another example, the prompt receiver 135 can identify any restrictions 175 associated with the wager opportunity 165 included in the prompt. For example, the prompt can specify, "Suggest a wager limit on a parlay wager for the Thunderbolts to win their game and cover the spread," and the prompt receiver 135 can extract the parlay legs (e.g., the Thunderbolts winning and covering the spread) and the requested restriction (i.e., suggesting a wager limit). Once the legs of the parlay and the relevant restrictions are extracted, the prompt receiver 135 can execute specific actions, such as referencing one or more components of the data processing system 105.

The data processing system 105 can include the device communicator 140. The device communicator 140 can be or include any script, file, program, application, set of instructions, or computer-executable code that is configured to facilitate communication between the data processing system 105, the client system 115, and the machine learning system 120. The device communicator 140 can include hardware, software, or any combination. The device communicator 140 can facilitate communication between the data processing system 105, the network 110, the client system 115, and/or the machine learning system 120 via one or more communication interfaces. A communication interface can include, for example, an API compatible with components of the data processing system 105, the client system 115, or the machine learning system 120.

The device communicator 140 can support various communication protocols (TCP/IP, UDP) compatible with a particular component of the data processing system 105, a particular component of the client system 115, or a particular component of the machine learning system 120. The device communicator 140 can implement multiple communication interfaces, including web sockets or messaging protocols, to accommodate a range of client applications. The device communicator 140 can facilitate data transfer through techniques such as compression, encryption, and error correction, among others. The device communicator 140 can be compatible with diverse content items and can be compatible with particular content delivery systems corresponding to particular content items, structures of data, types of data, or any combination thereof. For example, the device communicator 140 can be compatible with the transmission of text data or binary data structured according to one or more metrics or data of the application interface 180 or the client system 115. The device communicator 140 can provide the client system 115 with instructions to display lists of interactive options, such as live events, content items, or wagering opportunities.

The data processing system 105 can include the intent classifier 145. The intent classifier 145 can be or include any script, file, program, application, set of instructions, or computer-executable code that is configured to determine the classification of the request included in a user input, referred to as a prompt. The intent classifier 145 can include hardware, software, or any combination. The intent classifier 145 can parse prompts received from the client system 115 to determine the intent of the user. In some implementations, the intent of the user can correspond to wagering-related intents. For example, the intent classifier 145 can identify that a request, such as "Give me a wager on Team A", corresponds to a wagering-related intent.

In some implementations, the intent classifier 145 can classify an intent of a prompt as indicating a request for one or more restrictions 175 or restriction recommendations. For example, the intent classifier 145 can process prompts and identify keywords or phrases, such as "recommend", "suggest", "limit", or "restriction", among others, that indicate a request for restriction recommendations. In some implementations, the intent classifier 145 can evaluate the context of the prompt, including the current state of the player, such as recent wagering activity. Based on the evaluation, the intent classifier 145 can determine whether the intent of the prompt is to request restriction recommendations. For example, if a player has been placing large bets and consistently losing money, and the intent classifier 145 classifies a prompt such as "I need a suggestion", the intent classifier can interpret this as a request for restriction recommendations based on the player's recent wagering behavior.

In some implementations, the intent classifier 145 can identify an indication of a parlay wager opportunity from a prompt. For example, the intent classifier 145 can identify keywords or phrases, such as "parlay", "multi-leg", or "combination", among others, that indicate a parlay wager. In some implementations, the intent classifier 145 can identify patterns in the prompt, such as the indication of multiple teams, games, or events, that suggest the player is requesting a multi-leg bet. In some implementations, the intent classifier 145 can evaluate the overall context of the prompt based on various factors, such as recent wagering activity or discussions of multiple sporting events, to determine whether the prompt specifies a request for a parlay wager.

In some implementations, the intent classifier 145 can perform pattern recognition, intent detection, or other data extraction techniques to identify one or more parameters corresponding to restrictions 175, restriction recommendations, or wager opportunities 165 in the prompt. The intent classifier 145 can use rule-based techniques to classify the intent of one or more prompts. For example, a rule can specify that when a prompt includes a request related to "wager amount restriction", "a time restriction for wagers", "a frequency restriction for wagers", "an odds restriction for wagers", or "a wager type restriction" the intent classifier 145 can categorize the intent as restriction related. Similarly, when a prompt includes keywords or patterns suggesting a parlay wager (e.g., betting on multiple teams, games or events), the intent classifier 145 can identify the prompt as indicating a parlay wager opportunity.

In some implementations, a prompt such as "Give me a recommendation for deposit limits" or "I need to set a deposit limit" can cause the intent classifier 145 to identify an intent related to restrictions 175 or restriction recommendations. In another example, a prompt such as "Give me a wager on Team A winning and Team B covering the spread" can cause the intent classifier 145 to identify the intent related to a parlay wager opportunity. The intent classifier 145 can detect that the prompt specifies multiple legs, where one leg involves Team A winning and the other leg involves Team B covering the spread. In some implementations, the intent classifier 145 can implement one or more machine-learning models, such as sparse vector machines (SVMs), naive bayes, or deep learning architectures such as recurrent neural networks (RNNs) and transformers (e.g., BERT), to automatically classify intents related to restrictions 175, restriction recommendations, or wager opportunities within prompts and/or words/phrases thereof. The models can be trained on large datasets of user prompts and their corresponding intents. The intent classifier 145 can use the machine learning model(s) to detect requests for wager opportunities or restriction recommendations associated with specific parameters, such as wager amounts, time limits, or wager frequencies.

For a given prompt, the data processing system 105 can use the intent classifier 145 to generate an input context for the language model 195 using the prompt and its classification. The input context can include various types of information, such as prompts, questions, or previous parts of a conversation, as well as data and related metadata associated with one or more restriction-related parameters in the prompt. The intent classifier 145 can identify the desired action or information sought by the user and generate an input context to include data related to that intent. Based on the classified intent, the intent classifier 145 can generate an input context for the language model 195, which includes information about the keywords, the user's intent for restrictions 175 or restriction recommendations specified in the prompt, and any other relevant details. Based on the input context, the language model 195 can generate an output message that includes a command, function, or other type of indication that causes the data processing system 105 to reference the storage 125 and identify corresponding restrictions, such as deposit limits, time restrictions, or wager frequency limits, among others. The language model 195 can generate output messages corresponding to these restrictions 175 or restriction recommendations, which the data processing system 105 can present to the user via the application interface 180.

In some implementations, the intent classifier 145 can generate an input context for the language model 195 based on wager attributes associated with a wager opportunity 165 and the corresponding restriction 175. The input context can include details such as the wager type, odds, time, or whether the wager opportunity fails to satisfy the restriction. The intent classifier 145 can provide the input context to the language model for further processing. For example, if a player places a wager on a game with odds of 20:1, but the player profile 170 has a restriction limiting wagers to events with odds no greater than 3:1, the input context can include the wager type, event, odds, and the violation of the odds restriction.

In some implementations, the intent classifier 145 can generate an input context for the language model 195 using the set of wager attributes associated with the wager opportunity 165 and any applicable restrictions 175. The intent classifier 145 can collect information about a wager opportunity, such as the individual legs of the parlay, the odds for each leg, the combined odds, and any relevant restrictions, along with the player's preferences or betting history. The intent classifier 145 can format the data into a structured input context that the language model 195 can process. In some implementations, intent classifier 145 can use an API call or another mechanism to transmit the input context to the language model 195 for further analysis. For example, if a player selects a parlay wager with three legs (e.g., Team A to win, Team B to cover the spread, and Team C to score over 25 points), the input context can include the odds for each leg, the combined odds (e.g., 11.88), or any applicable restrictions (e.g., a maximum odds limit).

In some implementations, the intent classifier 145 or the prompt receiver 135, depending on the implementation, can process user requests related to wager or payout information. For example, upon receiving a prompt, such as "Place a wager on the Thunderbolts to win by more than 10 points?" the intent classifier 145 can determine that the prompt is a wager request. The intent classifier 145, via the data processing system 105, can cause the language model 195 to generate a data structure that includes the details of the potential payout based on the wager's outcome and associated odds. In some implementations, where the intent classifier 145 receives updates (e.g., updated odds for a wager), the intent classifier 145 can search through the existing wager data to find the corresponding wager based on identifiers (e.g., player ID, wager ID, or specific wager details).

The data processing system 105 can include the profile manager 150. The profile manager 150 can be or include any script, file, program, application, set of instructions, or computer-executable code that is configured to create, modify, delete, or otherwise manage player profiles 170 stored within the storage 125. The profile manager 150 can include hardware, software, or any combination. The profile manager 150 can store and organize player information, including account details, preferences, and gaming history, among others. The profile manager 150 can generate profile information based on data received from the client systems 115. This configuration can allow the profile manager 150 to capture activity across different interactive applications and different devices, and store records of that activity in the player profile 170. The profile manager 150 can update credit balances, game statistics, and other relevant information based on the outcomes of games played by the client system 115. The profile manager 150 can receive data about game results from the client system 115 and use this information to make adjustments to the player profile 170. In some implementations, the profile manager 150 can maintain a record of historical wagers associated with the player profile 170. For example, the profile manager 150 can store game statistics associated with the player profile 170, such as the number of wins, losses, and ties, as well as the player's average bet size, win percentage, and longest winning streak, among other data. In some implementations, the profile manager 150 can store records of player interactions, including prompts, responses, or conversation histories, with the language model 195.

In some implementations, the profile manager 150 can store various restrictions 175 associated with the player profile 170. For example, the profile manager 150 can generate a data structure to store restrictions such as a wager amount restriction, a time restriction for wagers, a frequency restriction for wagers, an odds restriction for wagers, or a wager type restriction. Each restriction 175 can include details such as the restriction type, the specific parameters (e.g., maximum wager amount, allowed wagering time, etc.), or any conditions associated with the restrictions 175. The profile manager 150 can track the status of the restrictions 175, indicating whether they are active, modified, or revoked. When a restriction 175 is applied, the profile manager 150 can associate it with the player profile 170. For example, when the data processing system 105 enforces or executes a restriction 175, the profile manager 150 can store and associate that restriction 175 with the player profile 170 to maintain a record of the active and historical restrictions 175.

In some implementations, the profile manager 150 can store one or more restrictions 175 associated with wager opportunities 165. For example, the profile manager 150 can generate a data structure to store recommended or requested wagers along with the corresponding restrictions 175. The data structure can include details such as the wager ID, the identifier for each wager opportunity 165, and any associated restrictions 175, such as a wager amount restriction, time restriction, or odds restriction. The profile manager 150 can track the status of each wager opportunity 165 and its associated restrictions 175, indicating whether they are pending, active, or completed. When a wager opportunity 165 is generated with specific restrictions, the profile manager 150 can store the wager opportunity 165 along with the restrictions 175 in the player profile 170. For example, if the data processing system 105 receives a wager request, such as "Place a wager on the Thunderbolts with a maximum bet of $50", the profile manager 150 can store the requested wager opportunity 165 and the associated restriction 175 in the player profile 170. Once the wager is placed, the profile manager 150 can update the status of the wager and the associated restriction to indicate that they are active.

In some implementations, the profile manager 150 can dynamically update the player profile 175 to indicate wagers and restrictions 175 as additional requests are received from client devices 115 associated with player profiles 170. The profile manager 150 can continuously track client devices 115 for incoming requests and process each to determine the appropriate updates to the player profile 175. When a request is received, such as placing a wager or modifying a restriction, the profile manager 150 can update the player profile 175 accordingly. For instance, the profile manager 150 can modify existing fields, such as adjusting the player's balance after a wager is placed, or dynamically updating restrictions 175 associated with the player profile 175. For example, if a player submits a request to "Place a wager on the Falcons to win their game with a maximum bet of $100", the profile manager 150 can update the player profile 175 by associating the wager and the corresponding restriction, such as storing the wager amount limit. If the player continues to place wagers frequently, the data processing system 105 can cause profile manager 150 to dynamically update the corresponding restriction 175 associated with the payer profile 170. In some implementations, if the data processing system 105 receives a request from the client device 115 to revoke or modify a restriction 175, the profile manager 150 can update the player profile 170 accordingly.

The profile manager 150 can evaluate the set of values generated by the language model 195 that are associated with the wager opportunity 165, such as a parlay wager, and can generate a set of wager attributes based on these values. The attributes can include the time of the wager opportunity, the odds associated with the wager opportunity, and the wager type. The profile manager 150 can store the generated attributes in association with the player profile 170 or in the storage 125. For example, if a player places a parlay wager on Team A winning and Team B covering the spread, the profile manager 150 can generate the time of the wager (e.g., specifying the time it was placed), the odds value (e.g., specifying the combined odds for the parlay), the wager type categorized as "parlay", or individual wagers, such as "Team A to win" and "Team B to cover the spread". In some implementations, the profile manager 150 can retrieve relevant event data from data source 190, such as details about the games or teams involved in the wager. In some implementations, the profile manager 150 can implement predefined rules to generate the appropriate wager attributes based on the type of wager.

The data processing system 105 can include the restriction manager 155. The restriction manager 155 can be or include any script, file, program, application, set of instructions, or computer-executable code that is configured to manage and enforce restrictions 175 related to wagering activities. The restriction manager 155 can generate or define restrictions 175 for player profiles 170. The restriction manager 155 can apply restrictions 175 to player profiles 170 based on specific criteria. The restriction manager 155 can modify or remove existing restrictions 175 associated with player profiles 170. The restrictions manager 155 can store restrictions 175 in the storage 125. The restrictions manager 155 can retrieve player data and restrictions 175 from the storage 125. The restrictions manager 155 can be integrated with other components of the data processing system 105, such as the profile manager 150.

In some implementations, the restriction manager 155 can determine whether a request for a wager recommendation fails to satisfy a restriction associated with a player profile 170. The restriction manager 155 can maintain a log of restrictions 175, including deposit limits, loss limits, time limits, wager type restrictions, odds restrictions, or frequency restrictions. The restriction manager 155 can evaluate each wager recommendation based on the restrictions 175 associated with the player profile 170. The restriction manager 155 can determine whether the wager recommendation or wager opportunity 165 complies with one or more of the applicable restrictions 175 and, if non-compliant, reject the wager request. In some implementations, the restriction manager 155 can utilize a rule engine to evaluate restrictions and compare the recommendation's attributes (e.g., wager amount, odds, etc.) with the restrictions 175 associated with the player profile 175. In some implementations, the restriction manager 155 can implement a decision logic to determine whether the wager recommendation is compliant or violates any restrictions 175.

In some implementations, the restriction manager 155 can dynamically modify or update restrictions 175 associated with the player profile 170. The restriction manager 155 can adjust restrictions 175 in real-time or near real-time based on various factors, such as changes in player behavior, including betting patterns, wager amounts, or time spent placing wagers. In some implementations, the restriction manager 155 can update restrictions 175 based on risk assessments or in response to regulatory changes, such as adjustments to industry regulations or laws. In some implementations, the restriction manager 155 can increase or decrease restrictions 175, such as raising or lowering deposit limits or modifying time limits, among others.

In some embodiments, the restriction manager 155 can evaluate restrictions 175 that are classified from input prompts. For example, the language model 195 can be trained or updated to specify a corresponding command or function to evaluate the restriction 175 specified in an input prompt. In another example, the intent classifier 145 can classify the restriction using the intent classification techniques described herein and can select a corresponding command or function to execute to evaluate the restriction 175. In some implementations, a restriction 175 may be associated with a future wager opportunity that cannot be evaluated immediately, but live events 192 or other occurrences can be monitored at a future time to evaluate whether the corresponding restriction 175 is satisfied. In such implementations, indications of restrictions 175 to be monitored may be stored in association with the player profile 170 that was used to provide the corresponding input prompts.

In some implementations, where a prompt indicates a request for a restriction recommendation, the restriction manager 155 can select a restriction 175 based on one or more historical wagers identified in the player profile 170. For example, the restriction manager 155 can evaluate historical wagers to identify patterns such as excessive losses, high-risk bets, or extended betting sessions. Based on the identified patterns, the restriction manager 155 can select appropriate restrictions 175, such as a wager amount restriction, that can mitigate potential risks. The data processing system 105 can provide the restriction recommendation to the associated client device 115. In some implementations, based on the identified restriction 175 and historical wagers associated with the player profile 170, the data processing system 105 can provide an input context to the language model 195 to cause the language model 195 to generate an output message that includes the selected restriction 175 and details about the historical wagers that led to the restriction recommendation. The language model 195 can generate an informative output message for the user that explains the recommended restriction 175 and provides context about the player's past betting behavior.

In some implementations, the restriction manager 155 can determine that a request for a wager opportunity 165 fails to satisfy a restriction 175 associated with the player profile 170. For example, the restriction manager 155 can evaluate the output generated by the language model 195, which can include details about a wager opportunity 165 and recommended restrictions 170. The restriction manager 155 can evaluate the output to identify any restrictions 175 and compare them to the existing restrictions 175 stored in the player profile 170. In some implementations, the restriction manager 155 can extract keywords or restrictions 175 from the output message generated by the language model 195. The restriction manager 155 can compare the identified restrictions 175 to predefined rules or patterns to determine if they apply to the player profile 170. If the recommendation does not comply with the restrictions 175 associated with the player profile 170, such as exceeding a wager limit, the restriction manager 155 can deny the request or notify the player via the notification sender 160.

In some implementations, the restriction manager 155 can evaluate the prompt to determine whether the restriction recommendation criteria are satisfied. For example, if a player requests, "Can you suggest some ways to limit my losses?", the restriction manager 155 can evaluate the keywords classified by the intent classifier 145, such as "limit" or "losses", as indicators of a request for restriction recommendations. In some implementations, the restriction manager 155 can determine that a prompt indicative of a wager opportunity satisfies the criteria. For example, if a player requests a wager opportunity 165, the restriction manager 155 can evaluate recent betting history or spending patterns to confirm that the prompt satisfies the criteria for generating a restriction recommendation. Based on the evaluation, the restriction manager 155 can generate or select a restriction 175, such as selecting a loss limit or similar restrictions.

In some implementations, the restriction manager 155 can evaluate the attributes associated with a generated wager opportunity to determine whether the generated wager opportunity 165 fails to satisfy any predefined restrictions 175. The restriction manager 155 can extract relevant attributes, such as time, odds, or wager type, from the wager opportunity 165. The restriction manager 155 can identify the relevant restriction 175 associated with the player profile 170 based on the attributes. For example, the restriction manager 155 can compare the attributes to the restrictions 175 associated with the player profile 170 to identify the most relevant restriction(s). For example, for a time-based restriction, the restriction manager 155 can compare the time of the wager to the defined time period if the player is limited in the number of wagers they can place per day. For an odds-based restriction, the restriction manager 155 can compare the odds associated with the wagers to the threshold if the player has a limit on wagers with odds above a certain value. Similarly, for a wager type restriction, the restriction manager 155 can compare the wager type to the prohibited types specified in the player profile 170. If any of the attributes, such as an odds value exceeding a threshold, do not satisfy the applicable restrictions 175, the restriction manager 155 can determine that the wager opportunity fails to satisfy the restriction 175. For example, if a player profile 170 indicates a restriction limiting wagers with odds greater than 3:1, and the wager opportunity has odds of 4:1, the restriction manager 155 can determine that the wager fails to satisfy the odds restriction.

In some implementations, the restriction manager 155 can evaluate a player's wagering activity to determine if they have exceeded a predefined threshold for the number of wagers placed within a specific time period. The restriction manager 155 can define the relevant time period (e.g., daily, weekly, or monthly) for a player profile 170 based on predefined rules, player preferences, or risk level. For example, a high-risk player may be evaluated over a shorter time period for wager frequency, while a low-risk player may have a longer evaluation period. The restriction manager 155 can compare the number of wagers placed by the player within that timeframe to the established threshold. If the number of wagers exceeds the threshold, the restriction manager 155 can determine that the restriction has been violated. For example, if a player profile 170 indicates that they are a high-risk gambler, the restriction manager 155 can define a daily threshold of 10 wagers for that player. If the player places more than 10 wagers in a single day, the restriction manager 155 can determine that the corresponding restriction has been violated.

In some implementations, the restriction manager 155 can determine a wager type based on the attributes associated with a wager opportunity, such as the number of legs (e.g., for parlays), the betting format (e.g., for moneyline or point spread), or the event details, among others. The restriction manager 155 can apply the corresponding restriction 175 based on the identified wager type. For instance, the restriction manager 155 can compare the wager type to the restrictions 175 associated with the player profile 170. For example, if a player profile 170 has a restriction on parlays but no restrictions on moneyline bets, and the wager type corresponds to a parlay wager, the restriction manager 155 can identify the restriction(s) associated with parlay wagers as applicable.

In some implementations, where a wager opportunity corresponds to a parlay wager, the restriction manager 155 can determine, based on the wager attributes, whether the wager opportunity fails to satisfy any restrictions. These wager attributes can include the time of the wager, the odds value, or the wager type (e.g., parlay). The restriction manager 155 can compare the relevant wager attributes associated with the wager opportunity 165 to the restrictions 175 in the player profile 170. In some implementations, the restriction manager 155 can define specific rules for evaluating parlay wagers or apply logical operators to compare the attributes to the restrictions 175. For example, if the player profile has a restriction limiting parlay wagers to a maximum of 5 legs and the current parlay wager has 7 legs, the restriction manager 155 can determine that the wager exceeds the number of legs restriction.

In some implementations, the restriction manager 155 can determine the odds value for a parlay wager opportunity based on the respective odds values of each leg. The restriction manager 155 can compare the calculated odds to the maximum odds limit or other applicable restrictions 175 associated with the player profile 170. If the combined odds exceed the threshold, the restriction manager 155 can determine that the wager violates the odds restriction. In some implementations, where the odds exceed the allowed limit, the restriction manager 155 can flag the wager as non-compliant. For example, if a player has a restriction limiting parlay wagers to a maximum combined odds of 5:1 and the calculated odds are 6:1, the restriction manager 155 can determine that the wager opportunity 165 fails to satisfy the odds restriction.

In some implementations, the restriction manager 155 can provide instructions or training examples to the language model 195 to cause the language model 195 to process and generate recommended restrictions 175 for wager opportunities 165. Training/updating/fine-tuning the language model 195 can include incorporating data related to restriction criteria, such as historical wager data, player profiles, responsible gaming guidelines, or examples of restriction recommendations. The language model 195 can be trained using supervised learning, reinforcement learning, or transfer learning techniques. By leveraging the training data, the language model 195 can learn to identify patterns in user prompts, such as requests for wager restrictions or behavior indicative of risky wagering, such that the language model 195 can generate more accurate recommended restrictions 175. In some implementations, through periodic retraining, incorporating updated datasets, and refining model parameters, the restriction manager 155 can facilitate the language model's ability to recommend or modify restrictions 175 effectively as player behaviors and wagering environments evolve.

The data processing system 105 can include the notification sender 160. The notification sender 160 can be or include any script, file, program, application, set of instructions, or computer-executable code that is configured to send notifications to client devices 115 based on the evaluation of restrictions 175 or recommended restriction 175. The notification sender 160 can transmit notifications to notify users about restrictions 175 related to wager opportunities 165 or other relevant information. For example, the notification sender 160 can notify a user when a restriction 175, such as a wager amount limit or time restriction, has been confirmed and associated with the player profile 170. In some implementations, the notification sender 160 can notify the user when a restriction 175 may not be applicable to the player profile 170.

In some implementations, the notification sender 160 can determine the client device 115 that is to receive a notification via the player profile 170 associated with the client device 115. The player profile 170 can indicate user preferences, restriction associations, wager opportunity associations, and other relevant criteria, which the notification sender 160 can use to select the appropriate client devices 115 for notification. The notification sender 160 can transmit push notifications to the client device 115 via APIs, email notifications to the user's registered email address, or in-app messages displayed within the application interface 180. In some implementations, the notification sender 160 can format the messages based on the user's preferences or the specific context of the notification.

The client system 115 can execute an application that communicates with the data processing system 105. The application can present one or more application interfaces 180. The application interface 180 can include a set of rules or protocols that allow different software programs or systems to communicate with each other. The application interface 180 can provide user interfaces to facilitate interaction. Users can input information, view content, or initiate actions through the application interface 180. In some implementations, the application interface 180 can be associated with a particular client application that communicates with the data processing system 105 to process user prompts that correspond to restrictions 175 associated with various wager opportunities 165, or intents related to wagers, players, or teams.

The client application can include an application executing on each client system 115. The client application can include a web application, a server application, a resource, a desktop, or a file. In some implementations, the client application can include a local application (e.g., local to a client system 115), a hosted application, a software-as-a-service (SaaS) application, a virtual application, a mobile application, and other forms of content. In some implementations, the client application can include or correspond to applications provided by remote servers or third-party servers. In some implementations, the client application can process user prompts associated with wagers, restrictions 175, or specific sports-related entities.

The application interface 180 can include graphical user interfaces or graphical elements that present content items, interaction modes, wager recommendations, or recommended restrictions 175. The application interface 180 can dynamically configure the graphical user interface based on the user's activities, preferences, or the identification of restrictions 175 associated with different wager opportunities 165 or recommended restrictions 175. In some implementations, the application interface 180 can receive interactions from the user, such as selections or specifications of wager opportunities 165 or associated restrictions 175 to be placed through the application interface 180. In response to receiving the interactions, the client application presenting the application interface 180 can communicate with the data processing system 105 to execute the placement of wagers or any corresponding restrictions 175. In some implementations, the application interface 180, via the client system 115, can cause the data processing system 105 to update the storage 125 to include the details of the wager counts or imposed restrictions 175. In some implementations, upon interaction with a graphical element, the application interface 180, via the data processing system 105, can cause the profile manager 150 to update a player profile 170 associated with the client system 115 to indicate any restrictions 175 applied based on the wagering activity.

The client communicator 185 within the client system 115 can be similar to, and include any of the structure and functionality of, the device communicator 140 described in connection with the data processing system 105. For example, the client communicator 185 within the client system 115 can communicate with the data processing system 105 via the network 110 using one or more communication interfaces to carry out the various operations described herein. The client communicator 185 can be compatible with particular content objects and can be compatible with particular content delivery systems corresponding to particular content objects, structures of data, types of data, or any combination thereof.

The machine learning system 120 can include the language model 195. The language model 195 can be trained on text data. For instance, the language models 195 can be trained/updated/fine-tuned to perform a variety of text processing tasks, including, but not limited to, generating text, generating commands to evaluate restrictions 175 for wager opportunities 165, comprehending and processing natural language input that includes intents corresponding to restrictions 175 or recommended restrictions 175, and responding to queries with contextually relevant information, such as commands or actions related to wager restrictions. The language model 195 can include a transformer architecture, such as a generative pre-trained transformer (GPT) architecture. The transformer architecture can include an encoder that can process the input text and a decoder that can generate the output text. The language model 195 can include multiple layers that can operate to process and generate text. For example, embedding layers can convert words or tokens into dense vectors of fixed size, attention layers can use mechanisms such as self-attention to weigh the importance of different tokens in a sequence, and feed-forward layers can apply transformations to the data to learn complex patterns. In some implementations, the language model 195 can use a self-attention mechanism to weight different parts of the input sequence when generating wager recommendations, wager opportunities 165, or restriction 175 associated with wager opportunities 165. The language model 195 can be trained/fine-tuned/updated on vast datasets. The language model 195 may be pre-trained using large corpuses of natural language text data, such that the language model 195 can efficiently process and provide output corresponding to natural language input.

Natural language input can have a syntactic structure in which individual words, collections of words (e.g., phrases), or relative positions of words (e.g., word order) can indicate specific meanings. The language model 195 can be trained/updated/fine-tuned to parse sentences into their grammatical components to understand the structure and relationships between words. The language model 195 can use phrasing structure rules that define how words combine to form phrases and sentences. The language model 195 can receive an input context, which can include a sequence of tokens and/or text data structured in a format compatible with an input layer of the language model 195. In some implementations, the language model 195 may include or may be associated with a tokenizer model, which can convert a text-based or media-based input context into a sequence of tokens compatible with an input layer of the language model 195. The input context may include natural language, structured data, or combinations thereof, and may specify instructions for the model to generate particular output (e.g., commands or actions corresponding to restrictions 175) according to the techniques described herein.

The language model 195 can receive an input context generated via the intent classifier 145. As described herein, the input context can include the user's prompt, the classification of the intent, relevant keywords associated with wager opportunities 165 or restrictions 175 identified based on the prompt, and additional instructions to evaluate restrictions 175 or wager opportunities 165 associated with the player profile 170. These additional instructions can function as a template or system prompt, guiding the language model 195 on how to generate commands tied to specific restrictions 175 or wager opportunities 165. The data processing system 105 can transmit the input context to the language model 195. The machine learning system 120 can execute the language model 195 to process the input context. The language model 195 can generate an output data structure including one or more tokens representing an output message generated based on the input context. In some implementations, tokens or combinations of tokens can indicate special control data for the language model, including but not limited to the beginning/end of prompts, natural language text, the evaluation of restrictions 175, the generation of commands based on the restrictions 175, the identification of wager opportunities 165 associated with events, the identification of restrictions 175 associated with events/wager opportunities, or any other type of data described herein. In some implementations, based on the prompt or player intent, the language model 195 can receive input contexts from the data processing system 105 in various formats, such as text, JSON, or structured data. The language model 195 can process the input context to determine a desired output or action, such as generating a command to evaluate or apply a restriction 175 associated with a wager opportunity 165 or to manage a wager opportunity 165 included in the prompt.

The language model 195 can process a wide range of input formats, including but not limited to text, audio, images, video, or other modalities. In some implementations, based on the input context, the language model 195 can generate output, which can range from simple text responses to complex data structures (e.g., generating commands), or combinations thereof. In some implementations, the language model 195 can use the input context to iteratively predict the next token word or phrase to generate responses in response to input contexts. Tokens may include a numerical representation of text data, function calls, special separators/control signals, or any other data described herein. In some implementations, the language model 195 can generate instructions or commands that automatically invoke tools or functions to perform specific tasks or operations, such as evaluating or executing restrictions 175 associated with wager opportunities 165, or retrieving relevant data associated with the player profile 170.

In some implementations, upon receiving a prompt from the client device 115, such as "Adam Patrick to score a touchdown and Team A to win", the language model 195 can generate a set of values corresponding to a wager opportunity 165, such as a parlay wager. The generated wager opportunity 165 can include details such as the teams involved, the odds for Adam Patrick to score a touchdown, the odds for Team A to win, the suggested wager amount, and any other relevant information. The language model 195 can parse the prompt into a list of strings, where each string specifies a specific entity (e.g., "Adam Patrick to score a touchdown" and "Team A to win"). The language model 195 can classify each selection as alternate or non-alternate. Alternate selections can be mutually exclusive (e.g., "Team A to win" or "Team B to win", where only one can happen), while non-alternate selections can occur simultaneously (e.g., "Team A to win" and "Team A to score over 25 points", which can both happen in the same game). Based on the classification, the language model 195 can generate an output message that provides a detailed representation of the parlay wager, including the individual legs, combined odds, or potential payout. In some implementations, the language model 195 can generate vector representations of each entity and perform similarity searches to identify related selections and provide accurate classification and contextual understanding of each leg of the parlay. For example, a prompt such as "Adam Patrick to score a touchdown and Team A to win" can result in an output message that includes the selections and their classifications as alternate or non-alternate.

In some implementations, the language model 195 can generate a data structure and/or formatting instructions that define the visual attributes of graphical elements. The data structure can include details such as text content, layout specifications, visual or graphical elements, and other interactive components. In some implementations, the language model 195 can generate a data structure, including details or instructions for generating a graphical element that displays wager opportunities 165, corresponding restrictions 175, or other relevant information. For example, the data structure can identify individual legs of the parlay, including the teams, wager types, odds for each leg, or any associated restrictions 175 (e.g., maximum odds or wager limits). In another example, the language model 195 can generate a data structure having instructions to present statistics or details relating to one or more live events 192. Such data structures can include details such as chart type, data points (e.g., team names, odds), axes labels (e.g., teams, scores, etc.), and formatting details (colors, fonts, sizes), which can be used to visualize real-time data or near real-time data from live events 192. The data structure can be parsed by the client system 115 to generate the visual representation of graphical elements. In some implementations, the language model 195 can generate data structures that include instructions for generating interactive elements such as hover effects, tooltips, or clickable regions. In some implementations, the language model 195 can adapt the generated data structure to accommodate specific player preferences for the visual representation.

In some implementations, the language model 190 can generate a data structure defining a graphical element, including properties such as type (button, menu, image), content, layout, and interactive behaviors, among others. In some implementations, the data structure can include metadata specifying the target application interface 180 to be navigated to upon interaction with the graphical element. The client system 115 can parse the received data structure and present the corresponding graphical element via the application interface 180. In some implementations, where a player interacts with the graphical element, for example, representing a wager recommendation or a restriction 175 associated with a wager opportunity 165, the data processing system 105 can update the associated player profile accordingly.

In some implementations, the language model 195 can generate a command for the data processing system 105 to evaluate a restriction 175 associated with a wager opportunity 165 included in the prompt. For example, the language model 195 can generate an output message that includes a command for the data processing system 105 to evaluate or select, via the restriction manager 155, a restriction from the restrictions 175 stored in the storage 125. The language model 195 can process the prompt to determine the user's intent related to the wager opportunity 165 or the associated restriction 175 and generate a command that causes the data processing system 105 to select, apply, or adjust a restriction 175 based on the wager opportunity 165.

In some implementations, upon receiving a request to revoke a restriction 175 associated with the player profile 170, the language model 195 can evaluate the prompt to interpret the user's intent. Based on the analysis, the language model 195 can generate a command causing the data processing system 105 to revoke the specified restriction 175. For example, if the user requests, "Remove the wager limit for my next wager", the language model 195 can generate a command that causes the data processing system 105 to revoke, via the restriction manager 155, the applicable restriction 175 from the player profile 170.

In some implementations, the language model 195 can generate recommended restriction 175 for wager opportunities 165. For example, the language model 195 can process a prompt such as "Recommend restrictions for placing a bet on the Thunderbolts with odds better than 3:1" and generate an output message that includes a specific restriction, such as "Set a wager amount limit of $200 for this bet". The data processing system 105, via the restriction manager 155, can apply or adjust the recommended restriction 175 based on the player profile 170 and other relevant factors, such as the player's historical betting behavior, current balance, or previously set restrictions. In some implementations, the restriction manager 155 can use external factors, such as recent regulatory changes or responsible gaming guidelines, such that the restriction recommendation aligns with the player's preferences and responsible wagering practices.

In some implementations, the language model 195 can generate an output message corresponding to a parlay wager (e.g., a custom multi-game parlay) based on the prompt. The language model 195 can evaluate the prompt to identify the specific wagers the player intends to include in the parlay and generate a set of values that define the wager opportunity 165. In some implementations, the language model 195 can specify wager types, teams or events involved, odds for each individual wager, or the potential payout. In some implementations, based on the prompt, the language model 195 can generate a wager opportunity 165 that includes the individual wagers in the parlay, the combined odds for the parlay, the potential payout if the parlay is successful, and any other relevant information, such as the deadline for placing the wager.

In some implementations, the language model 195 can generate an output message based on the attributes associated with the wager opportunity, indicating whether the wager opportunity fails to satisfy a restriction. The language model 195 can process the wager attributes, such as time, odds, or type, along with information about the violated restriction. In some implementations, using natural language processing techniques, the language model 195 can generate the output message that indicates the violation, specifies the restriction that was violated, or provides an explanation. In some implementations, the language model 195 can use a pre-defined template for the output message, with placeholders for specific information. In some implementations, the language model 195 can customize the message based on the specific violation or preferences associated with the player profile 170. For example, if a player exceeds a wager limit for a parlay wager by requesting $100,000, the language model 195 can generate a message such as, "Your parlay wager has been declined due to exceeding your wager limit of $500. Please adjust your wager amount or choose a smaller wager to proceed". In cases of repeated violations, the language model 195 can generate a command for the data processing system 105 to temporarily block the account associated with the player profile 170. In such instances, the language model 195 can generate an output message such as, "Your account has been temporarily suspended due to multiple violations of your wager limits. Please contact support for assistance".

In some implementations, the language model 195 can generate an output message that includes a data structure identifying data for each leg of the parlay wager opportunity. The data structure can include details such as a list of the individual wagers that make up the parlay, the combined odds for the entire parlay, the potential payout, or any applicable restrictions for the wager opportunity. If the parlay violates any restrictions, the language model 195 can include an indication of the violation in the output message, such as a specific message or a flag. In some implementations, the language model 195 can generate an output message indicating that the threshold number of wagers within the specified time period has been exceeded. For example, if a player has a daily wager limit of 10 and places more than 10 wagers in a single day, the language model 195 can generate an output message such as, "You have exceeded your daily wager limit of 10 bets. Please adjust your wagering activity or consider taking a break".

In some implementations, where the client system 115 is associated with a player profile 170, the data structure generated by the language model 195 can include instructions to generate an interactive element that, when interacted with, can cause the client system 115 to transmit a request to the profile manager 150 to update the player profile 170 based on, for example, the recommended restrictions 175. The data processing system 105 can provide the output message, including the restriction recommendation along with other relevant details, to the client device 115. The user can review, confirm, or modify the recommended restrictions 175 within the application interface 180. The client device 115 can transmit the user's confirmation or modifications to the data processing system 105, which can update the player profile 170 based on the user's input. For example, if the user interacts with a recommendation, such as "Set a $100 wager limit on the Thunderbolts game", the data processing system 105, via the profile manager 150, can update the player profile 170 accordingly.

In some implementations, where a wager opportunity 165 fails to satisfy a restriction 175, such as exceeding a $200 wager limit, the language model 195 can cause the data processing system 105 to provide the output message to the client device 115, notifying the user of the restriction violation. In some implementations, the interactive element within the application interface 180 can provide options for the user to modify the wager to comply with the restriction. The client device 115 can transmit the user's modifications or acceptance of the restriction to the data processing system 105 to cause the data processing system 105 to update the player profile 170 accordingly. For example, if the user agrees to reduce the wager to meet the $200 limit, the profile manager 150 can update the player profile 170 to indicate the change.

In some implementations, if a violation is severe, such as exceeding a self-exclusion period or violating a mandatory restriction, the language model 195 can generate a command for the data processing system 105 to block the player from placing any further wagers for a defined duration. For example, if a player repeatedly places high-risk parlay wagers, the language model 195 can generate a command causing the data processing system 105 to temporarily block the player's account, preventing them from placing any additional bets until the restriction 175 is lifted.

In some implementations, the data structure generated by the language model 195 can include instructions to generate an interactive element that, when interacted with, can cause the data processing system 105 to update the player profile 170 based on, for example, wager recommendations or opportunities. In some implementations, the language model 195 can process input contexts for payout information. For example, upon receiving an input context about wager winnings, the language model 195 can generate a data structure, including the details of the potential payout based on the wager's outcome and odds. The client system 115 can parse the data structure and present the information along with any relevant details via the application interface 180.

In some implementations, the language model 195 can generate data structures corresponding to wager details associated with a live event 182, such as the wager type (e.g., moneyline, point spread, parlay) and relevant details, such as teams, odds, and bet amounts. In some implementations, the language model 195 can generate an additional data structure or update an existing data structure in response to receiving an input context that includes updated information, such as new odds for a specific wager. The data structure can include a timestamp indicating when the update occurred and a list of changes. For example, each change can specify the field that was modified. The language model 195 can transmit the updated data structure, including the updated wager data, to the client system 115 via the data processing system 105.

In some implementations, the language model 195 can generate data structures when restrictions 175 are modified or revoked. For example, if a player modifies a restriction, such as increasing the wager limit or revoking an odds restriction, the language model 195 can update the corresponding data structure to specify the changes. The data structure can include details such as the restriction type, the modification made, or the time of the update. The language model 195 can transmit the updated data structure, including wager and restriction updates, to the client system 115 via the data processing system 105.

In some implementations, the data processing system 105 can execute the language model 195 as a component. In some implementations, the data processing system 105 can select one of a set of language models 195 to use in connection with the techniques described herein based on different factors, including but not limited to computational complexity, efficiency, and task-specific capabilities, among other attributes. The data processing system 105 can use data cleansing, model-specific tokenization, or other standardization techniques to maintain compatibility with the language model 195. In some implementations, the data processing system 105 can implement batch processing, data streaming, or asynchronous data management techniques to manage data flow into the language model 195. In some implementations, where the data processing system 105 is using an API to access the functionality of the language model 195, the data processing system 105 can integrate API calls into its operational workflow to carry out any tasks described herein. In some implementations, where the data processing system 105 is deploying the language model 195 on local infrastructure, the data processing system 105 can load the language model 195 into system memory. The data processing system 105 can format incoming data to match the input structure of the language model 195.

Figure 2:
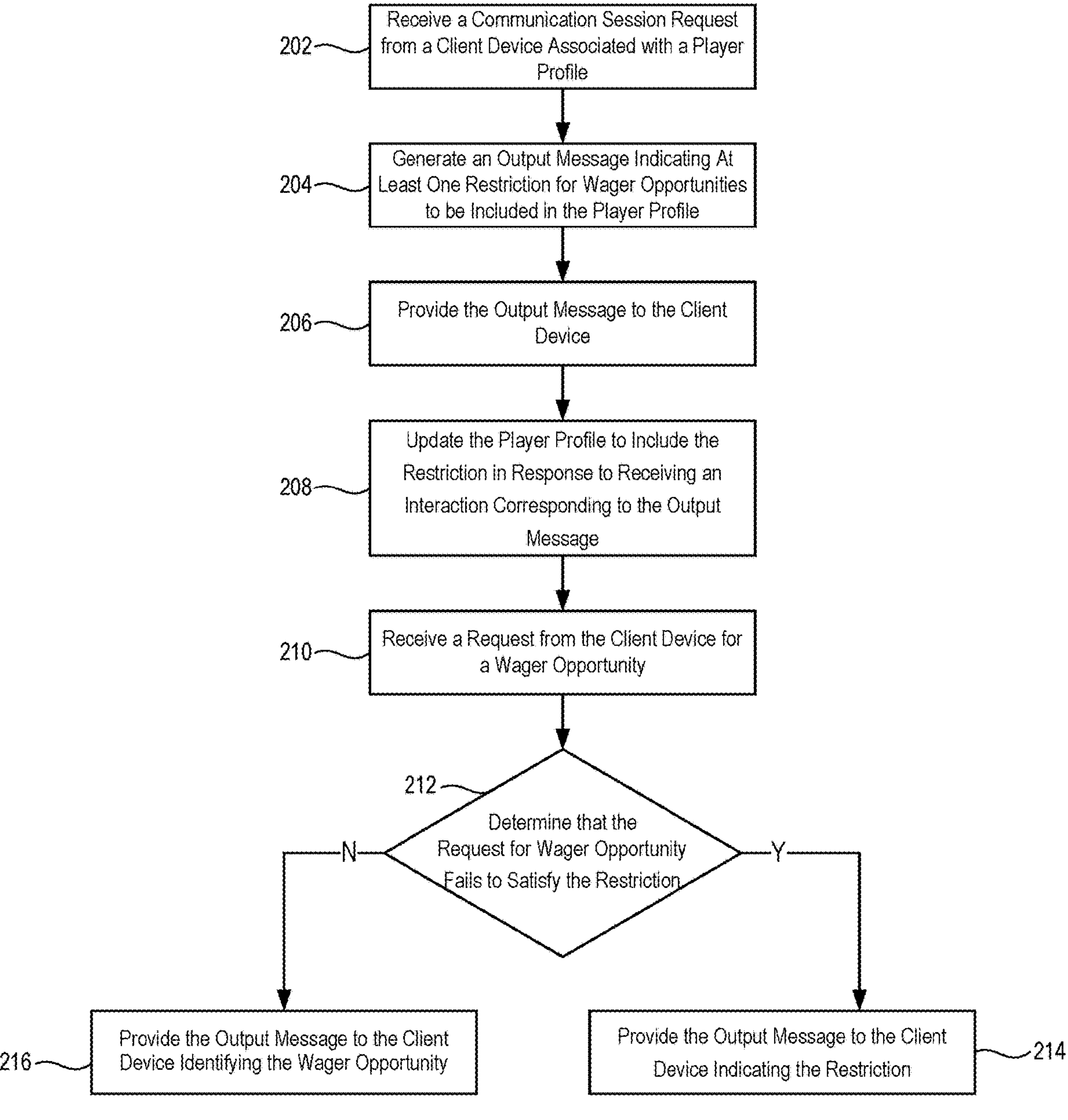
FIG. 2 illustrates an example flow diagram of a method for generating restrictions for network interactions according to language model output, in accordance with one or more implementations.

B. Systems and Methods for Generating Restrictions for Network Interactions According to Language Model Output Referring now to FIG. 2, depicted is an illustrative flow diagram of a method 200 for generating restrictions for network interactions according to language model output. The method 200 can be executed, performed, or otherwise carried out by a server or a system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110). In a brief overview of method 200, the server or the system can receive a communication session request from a client device associated with a player profile (STEP 202), generate an output message indicating at least a restriction for wager opportunities to be included in the player profile (STEP 204), provide the output message to the client device (STEP 206), update the player profile to include the restriction in response to receiving an interaction corresponding to the output message (STEP 208), receive a request from the client device for a wager opportunity (STEP 210), determine that the request for wager opportunity fails to satisfy the restriction (STEP 212), provide the output message to the client device indicating the restriction responsive to determining that the request for wager opportunity fails to satisfy the restriction (STEP 214), and provide the output message to the client device identifying the wager opportunity responsive to determining that the request for wager opportunity satisfies the restriction (STEP 216).

In further detail of method 200, the data processing system can receive a communication session request from a client device associated with a player profile (STEP 202). A communication session can refer to a conversational interaction between a player and the data processing system. A communication session can be initiated when a player accesses a client application via the client device. Each communication session can be identified and tracked. In some implementations, a communication session can include any number of prompts and responses exchanged between the player and the data processing system. A player may provide one or more prompts for transmission to the data processing system via input to a graphical user interface of the application. For example, upon player interaction with an interactive element presented by an application, such as clicking a button or entering text, a prompt can be generated and added to the conversation record associated with the session. The data processing system can process the prompt and generate a corresponding response, which can be appended to the conversation record of the communication session. In some implementations, the data processing system can establish a communication session with the client device using various protocols, such as HTTP, WebSocket, or other network-based communication methods. The connection can allow for the exchange of data and messages. The data processing system can identify or record the specific client device engaged in the communication session, as described herein.

The data processing system can generate an output message indicating at least a restriction for wager opportunities to be included in the player profile (STEP 204). For example, using a language model and the prompt, the data processing system can generate an output message indicating a restriction for wager opportunities to be included in the player profile. The restriction can include various options, such as a wager amount restriction, a time restriction for wagers, a frequency restriction for wagers, an odds restriction for wagers, or a wager type restriction. In some implementations, the prompt can indicate a restriction, and the data processing system can generate an output message that includes a request for confirmation of the selected or recommended restriction. The data processing system can select a restriction from a plurality of restrictions based on the prompt, such as a wager amount limit, time restriction, or odds limit.

In some implementations, where the prompt indicates a request for a restriction recommendation, the data processing system can select a restriction based on historical wagers identified in the player profile. For example, if the user requests, “Recommend a wager limit”, the data processing system can evaluate past wagers and suggest a $100 limit based on the user’s previous betting patterns. The data processing system can generate an output message that includes the restriction and an indication corresponding to historical wagers. In some implementations, the data processing system can classify the intent of the prompt as a request for restriction recommendations and generate the output message based on the classified intent. For example, if the prompt is “I need help controlling my spending”, the data processing system can classify the intent as a request for a wager amount restriction. The data processing system can determine the appropriate restriction based on the intent.

In some implementations, the data processing system can receive, from the client device, a prompt indicating a request to revoke a restriction associated with the player profile. In response to the prompt, the language model can generate a command to cause the data processing system to revoke the specified restriction from the player profile. For example, if the user requests, “Remove my wager limit for the Thunderbolts game”, the language model can generate a command for the data processing system to cause the data processing system to revoke the specified restriction from the player profile and update the player profile accordingly.

The data processing system can provide the output message to the client device (STEP 206). For example, the data processing system can provide, during the communication session, the output message, via the language model, to the client device in response to the prompt. The output message can include a request for confirmation of the selected restriction. For example, if the user prompts, “Set a $200 wager limit for the Thunderbolts game”, the data processing system can generate, via the language model, an output message asking the user to confirm this wager limit. In some implementations, the output message can include the restriction and an indication corresponding to historical wagers. For example, if the data processing system recommends a time restriction of 30 minutes per session, the output message can state, “Based on your recent gambling patterns, I recommend limiting your sessions to 30 minutes”. In some implementations, in response to the classified intent, the data processing system can generate the output message accordingly. For example, if the prompt is “I need help controlling my spending”, the output message can recommend, “I suggest setting a $100 wager limit per game to help manage your spending”.

The data processing system can update the player profile to include the restriction in response to receiving an interaction corresponding to the output message (STEP 208). For example, a player can confirm their agreement to the recommended restriction via a client device. Upon receiving confirmation from the client device, the data processing system can update the player profile by adding a new restriction, modifying an existing one, or removing a previous restriction, among others. For instance, if the data processing system recommends a deposit limit of $500 and the player confirms the recommendation, the data processing system can update the player profile to indicate the updated $500 deposit limit.

The data processing system can receive a request from the client device for a wager opportunity (STEP 210). Each wager opportunity can correspond to a predefined wager type, such as “Team A to win the game”, “Total points scored over/under X points”, or “Player C to score over X points”. The data processing system can generate and manage a collection of wager opportunities, which can be directly associated with live events. The data processing system can maintain wager opportunities and their odds by updating them in response to detected changes in the corresponding live events. In some implementations, the data processing system can receive a prompt from a client device associated with a player profile. The player profile can include relevant information, such as preferences, betting history, and other data. Upon receiving the prompt, the data processing system can identify the associated player profile and, based on the user’s preferences, wagering history, or any applicable restrictions, provide or recommend a corresponding wager opportunity.

The data processing system can determine that the request for wager opportunity fails to satisfy the restriction (STEP 212). The data processing system can determine that the wager request fails to satisfy the restriction included in the player profile. For example, the data processing system can evaluate whether the wager opportunity violates any restrictions such as a wager amount restriction, a time restriction, a frequency restriction, an odds restriction, or a wager type restriction. For instance, if the player profile includes a daily wager limit of $100 and they attempt to place a wager for $200, the data processing system can determine that the prompt fails to satisfy the wager amount restriction.

The data processing system can provide the output message to the client device indicating the restriction responsive to determining that the request for wager opportunity fails to satisfy the restriction (STEP 214). The data processing system can transmit the output message via one or more communication channels, such as a push notification, in-app message, or email. For example, if a player attempts to place a wager that exceeds their deposit limit, the data processing system can transmit an output message stating, "Your wager has been declined. You have exceeded your daily deposit limit of $100".

In some implementations, the data processing system can determine that the wager request fails to satisfy a restriction based on the output of the language model. For example, the language model can generate a recommendation for a wager opportunity, which can include details about the recommended wager, potential risks, or suggested restrictions. The restriction manager of the data processing system can evaluate the output of the language model. For example, the restriction manager can compare the identified restrictions to the restrictions associated with the player profile. If the recommendation violates any of the player's restrictions, the data processing system can determine that the wager request fails to satisfy a restriction.

The data processing system can provide the output message to the client device identifying the wager opportunity responsive to determining that the request for wager opportunity satisfies the restriction (STEP 216). The data processing system can determine whether the restriction recommendation criteria is satisfied based on a prompt indicative of betting activity that causes the data processing system to recommend relevant restrictions. For example, in some implementations, where a prompt reads, "I want to bet $100 on Team A to win the Super Bowl", the data processing system can identify keywords, such as "bet", "Team A", or "Super Bowl", as indicators of wagering intent. The data processing system can evaluate the player profile and compare wager requests with the applicable restrictions based on the player's betting history, preferences, or any self-imposed limits. In response to determining that the restriction recommendation criteria are satisfied, the data processing system can provide an output message to the client device. The output message can identify the corresponding wager opportunity (e.g., bet $100 on Team A to win the Super Bowl) along with any relevant details, such as the odds or potential payout.

Figure 3:
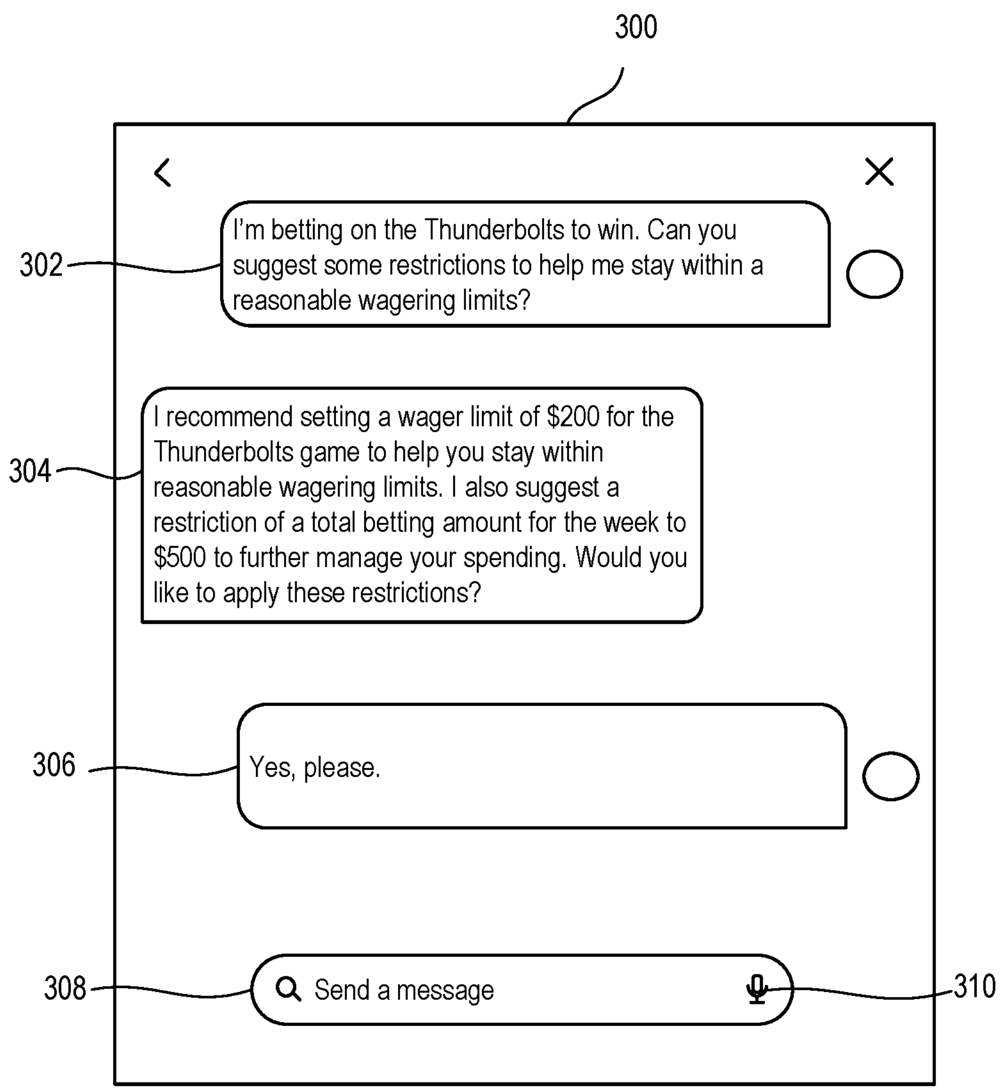
FIG. 3 illustrates an example implementation of an application interface in connection with FIG. 2, in accordance with one or more implementations.

Referring now to FIG. 3, depicted is an example implementation of an application interface, as described in connection with FIG. 2. As shown, a graphical user interface 300 can display a prompt 302 based on a player's interaction with a message bar 308. The prompt 302 can be an initial prompt or search term entered by the player via the message bar 308. The message bar 308 can be used to input text or initiate voice commands for sending prompts 302. For example, players can type their message directly into the designated text box within the message bar 308, or they can use a microphone icon 310 to dictate their prompts. In this example, the prompt 302 reads, "I'm betting on the Thunderbolts to win. Can you suggest some restrictions to help me stay within a budget?", indicating a request for recommending wager restrictions to assist the player in managing their spending.

The data processing system 105 can receive text data entered into the prompt 302 as input from the client system 115 over the network 110. Upon receiving the prompt, the data processing system 105 can determine the classification of the intent behind the request based on keywords, such as "betting", "Thunderbolts", "restrictions", and "budget". The data processing system 105 can generate an input context for the language model 195 based on the classified prompt, which can include details about the player's request for recommended restrictions 175 related to the wager opportunity 165, such as the team/event and the intent to manage wagering within a budget.

The language model 195 can process the input context, which can include the prompt, identified wager opportunity data, and in some implementations any relevant restriction 175, to generate a command for the data processing system 105. For example, the command generated by the language model 195 can cause the data processing system to evaluate or select, via the restriction manager 155, any applicable restrictions 175 associated with the player profile 170 based on the wager opportunity 165. In some implementations, the language model 195 can generate a data structure corresponding to the recommended restriction 175 for the wager opportunity 165, which can include information such as the recommended wager limit or total betting limit for a week. The data structure can be in a format such as JSON, XML, or any other type of structured format. The client system 115 can parse the data structure to display an output message 304 via the graphical user interface 300, such as, "I recommend setting a wager limit of $200 for the Thunderbolts game to help you stay within reasonable wagering limits. I also suggest limiting your total betting amount for the week to $500 to further manage your spending. Would you like to apply this restriction?". In some implementations, the graphical user interface 300 can display options for the user to confirm or modify these restrictions 175.

The data processing system 105 can receive a prompt 306 from the client system 115 that reads "Yes, please". The prompt 306 can function as the user's confirmation to cause the data processing system 105 to apply the recommended restrictions 175 generated by the language model 195. For example, upon receiving the confirmation, the data processing system 105 can instruct the restrictions manager 155 to update the player profile 170 with the corresponding restrictions 175, such as the $200 wager limit for the Thunderbolts game and the $500 weekly betting limit. The data processing system 105 can cause the profile manager 150 to associate these restrictions 175 with the player profile 170.

Figure 4:
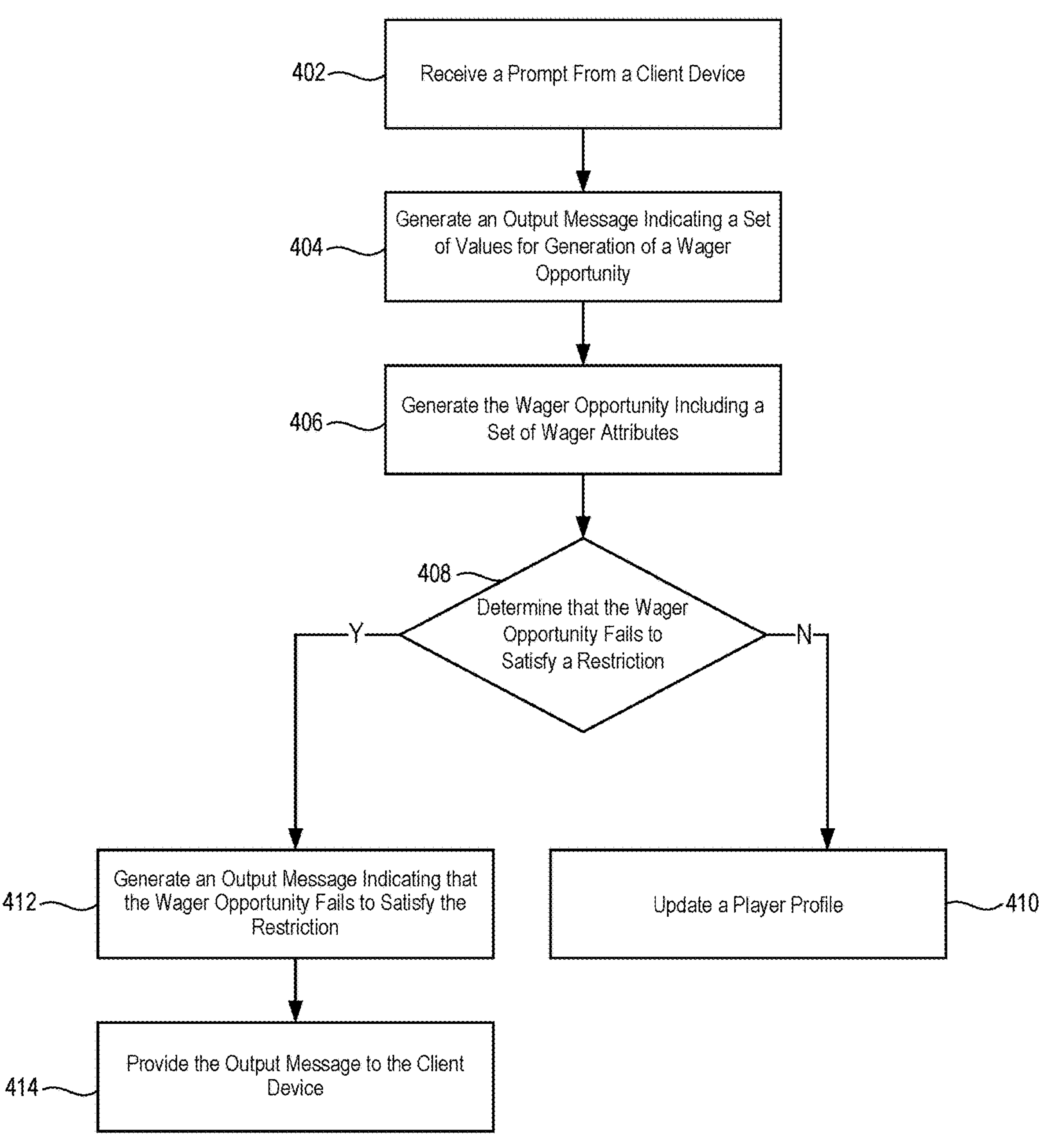
FIG. 4 illustrates an example flow diagram of a method for automatically enforcing restrictions for network interactions using language models, in accordance with one or more implementations.

C. Systems and Methods for Automatically Enforcing Restrictions for Network Interactions Using Language Models Referring now to FIG. 4, depicted is an illustrative flow diagram of a method 400 for automatically enforcing restrictions for network interactions using language models. The method 400 can be executed, performed, or otherwise carried out by a server or a system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110). In a brief overview of method 400, the server or the system can receive a prompt from a client device (STEP 402), generate an output message indicating a set of values for generation of a wager opportunity (STEP 404), generate the wager opportunity including a set of wager attributes (STEP 406), determine that the wager opportunity fails to satisfy a restriction (STEP 408), update a player profile responsive to determining that the wager opportunity satisfies the restriction (STEP 410), generate an output message indicating that the wager opportunity fails to satisfy the restriction (STEP 412), and provide the output message to the client device (STEP 414).

In further detail of method 400, the data processing system can receive a prompt from a client device (STEP 402). The data processing system can receive a prompt for a communication session from a client device associated with a player profile. A communication session can refer to a conversational interaction between a player and the data processing system. A communication session can be initiated when a player accesses a client application via the client device. Each communication session can be identified and tracked. In some implementations, a communication session can include any number of prompts and responses exchanged between the player and the data processing system. A player may provide one or more prompts for transmission to the data processing system via input to a graphical user interface of the application. For example, upon player interaction with an interactive element presented by an application, such as clicking a button or entering text, a prompt can be generated and added to the conversation record associated with the session. The data processing system can process the prompt and generate a corresponding response, which can be appended to the conversation record of the communication session. In some implementations, the data processing system can establish a communication session with the client device using various protocols, such as HTTP, WebSocket, or other network-based communication methods. The connection can allow for the exchange of data and messages. The data processing system can identify or record the specific client device engaged in the communication session, as described herein.

The data processing system can generate an output message indicating a set of values for generation of a wager opportunity (STEP 404). The data processing system can generate, using a language model and the prompt, an output message indicating a set of values for the generation of a wager opportunity. Upon receiving a prompt from the client device, such as "Adam Patrick to score a touchdown and Team A to win", the data processing system can utilize a language model to generate a set of values corresponding to the parlay wager. The generated wager opportunity can include details such as the teams involved, the odds for Adam Patrick to score a touchdown, the odds for Team A to win, the suggested wager amount, and any other relevant information. The language model can parse the prompt into a list of strings, where each string specifies a specific entity (e.g., "Adam Patrick to score a touchdown" and "Team A to win"). The language model can classify each selection as alternate or non-alternate. Alternate selections can be mutually exclusive (e.g., "Team A to win" or "Team B to win", where only one can happen), while non-alternate selections can occur simultaneously (e.g., "Team A to win" and "Team A to score over 25 points", which can both happen in the same game). Based on the classification, the language model can generate an output message that provides a detailed representation of the parlay wager, including the individual legs, combined odds, or potential payout. In some implementations, the language model can generate vector representations of each entity and perform similarity searches to identify related selections and provide accurate classification and contextual understanding of each leg of the parlay. For example, a prompt such as "Adam Patrick to score a touchdown and Team A to win" can result in an output message that includes the selections and their classifications as alternate or non-alternate. In some implementations, the output message can be in a format such as JSON, including fields for each leg, combined odds, potential payout, or any applicable restrictions.

The data processing system can generate the wager opportunity including a set of wager attributes (STEP 406). The data processing system can generate, using the set of values, the wager opportunity corresponding to the set of values. The wager attributes can correspond to a specific wager type, such as a parlay wager, and can include details such as the time of the wager, the odds value, or a type of wager. In some implementations, the wager attributes can correspond to an odds value for the parlay wager opportunity determined based on the respective odds values of each leg of the parlay wager opportunity, and in some implementations may include the respective odds values of each leg of the parlay wager opportunity. For example, by combining the individual odds for each selection in the parlay, the data processing system can determine the combined odds value for the wager opportunity.

The data processing system can determine that the wager opportunity fails to satisfy a restriction (STEP 408). The data processing system can identify the restrictions associated with the player profile and select one or more relevant restrictions from the player profile based on the wager type, such as the parlay wager. In some implementations, based on the set of wager attributes, such as the odds value, wager amount, or time, the data processing system can evaluate whether the wager opportunity satisfies the identified restriction(s). The data processing system can determine that the wager opportunity fails to satisfy the restriction if one or more of the wager attributes fail to satisfy the applicable restriction(s). For example, if the odds value of the wager exceeds a threshold defined in the player profile, the data processing system can determine that the wager opportunity does not comply with the restriction. In some implementations, the restrictions can include a limit on the number of wagers a player can place within a specific time period, such as daily or weekly limits. After generating the wager opportunity, the data processing system can evaluate the player profile to identify whether the threshold number of wagers has already been reached or exceeded within the designated time period. If the number of wagers placed by the player exceeds the limit, the data processing system can determine that the generated wager opportunity fails to satisfy the restriction associated with the player profile.

The data processing system can update a player profile responsive to determining that the wager opportunity satisfies the restriction (STEP 410). For example, if a player places a wager that complies with the associated restriction (s), such as staying within the wager limit or satisfying odds thresholds, the data processing system can update the player profile. In some implementations, the data processing system can update the wager history associated with the player profile and adjust the available credit balance with respect to the wager associated with the wager opportunity.

The data processing system can generate an output message indicating that the wager opportunity fails to satisfy the restriction (STEP 412). For example, after evaluating the set of wager attributes and identifying that a restriction has been violated, the data processing system can utilize a language model to generate an output message to inform the player of the failure to satisfy the restriction. The data processing system can generate an input context for the language model by incorporating the relevant wager attributes and the specific restriction that was not satisfied. In some implementations, the output message generated by the language model can include details such as exceeding the threshold number of wagers within a specified time period or other restriction breaches, such as odds exceeding a defined limit.

The data processing system can provide the output message to the client device (STEP 414). For example, the data processing system can transmit a notification to the client device associated with the player profile via push notification, in-app message, or email, informing the player about the status of the wager and whether it satisfies or fails to satisfy a restriction. For example, the output message can state, "Your wager on Team A to win and Team B to cover the spread has been declined due to exceeding the daily wager limit of 10 bets. Please adjust your wager to comply with the limit". In cases of repeated violations, the output message can include a temporary account block, such as "Due to multiple violations of your wager limits, your account has been temporarily suspended. Please contact support for assistance".

Figure 5:
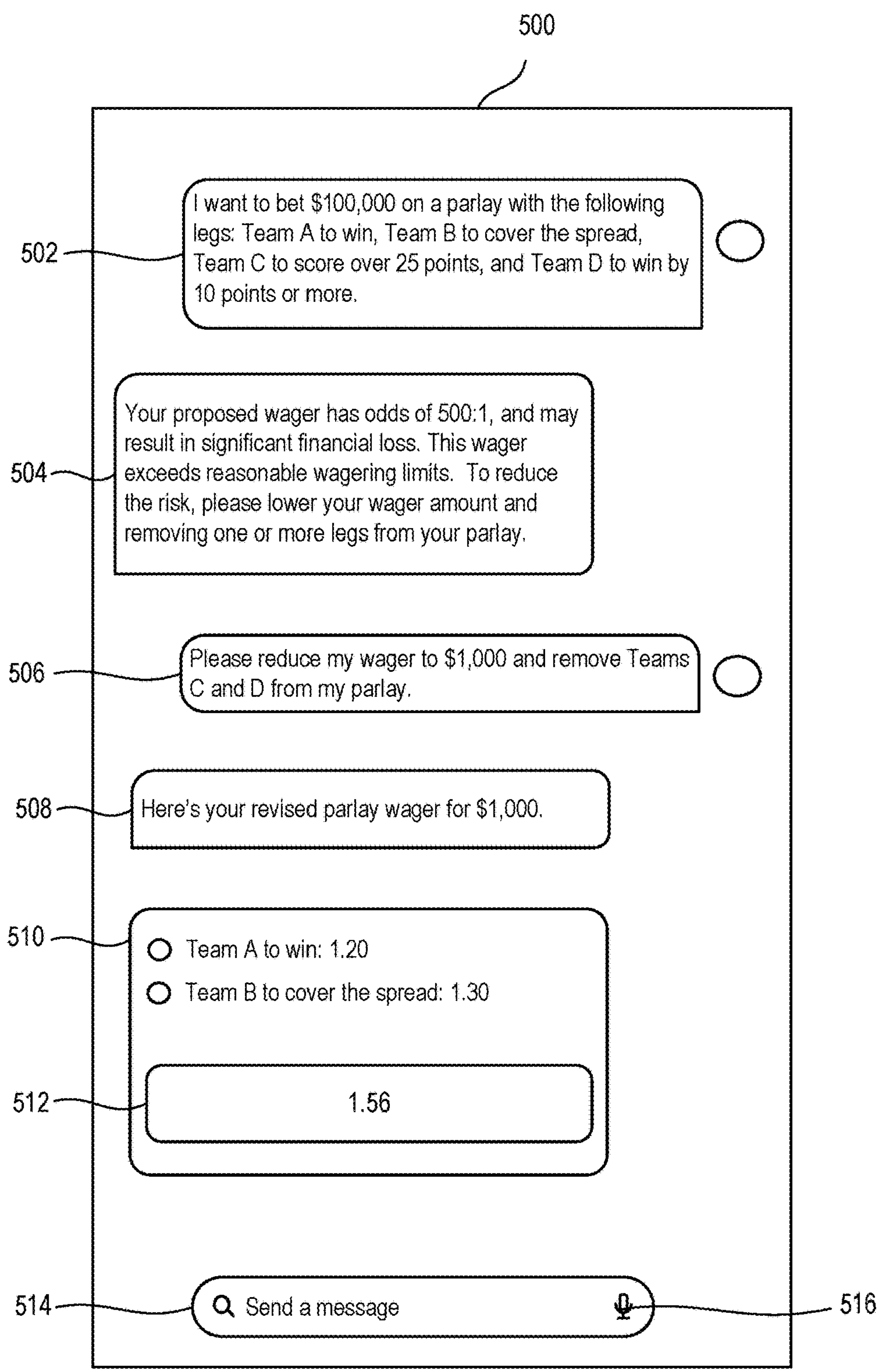
FIG. 5 illustrates an example implementation of an application interface in connection with FIG. 4, in accordance with one or more implementations.

Referring now to FIG. 5, depicted is an example implementation of an application interface, as described in connection with FIG. 4. As shown, a graphical user interface 500 can display a prompt 502 based on a player's interaction with a message bar 514. The prompt 502 can be an initial prompt or search term entered by the player via the message bar 514. The message bar 514 can be used to input text or initiate voice commands for sending prompts. For example, players can type their message directly into the designated text box within the message bar 514, or they can use a microphone icon 516 to dictate their prompts. In this example, the prompt 502 reads "I want to bet $100,000 on a parlay with the following legs: Team A to win, Team B to cover the spread, Team C to score over 25 points, and Team D to win by 10 points or more", indicating a request for a parlay wager based on the outcomes of multiple events or wager opportunities 165.

The data processing system 105 can receive the text data entered into the prompt 502 as input from the client system 115 over the network 110. Upon receiving the prompt, the data processing system 105 can determine the classification of the intent behind the request based on keywords, such as "bet $100,000", "odds", "parlay", "Team A", "Team B", "Team C", or "Team D". The data processing system 105 can evaluate the wager attributes associated with the wager opportunity 165, including the wager amount, number of legs, odds value, or wager type. In this example, the wager opportunity is flagged as very high-risk due to the large bet amount and the combined odds value of 500:1, which exceed the restriction associated with the player profile 170, such as a limit on odds or wager size. In some implementations, the odds value can be determined by the data processing system 105 based on the wager amount. In some implementations, the odds value can be extracted from an external data source, such as a sportsbook API, to obtain the current odds for the specific wager.

The data processing system 105 can generate an input context for the language model 195 based on the classified prompt, which can include details such as the teams involved (e.g., Team A, Team B, Team C, and Team D), the event type, the wager type (parlay), and the high-risk nature of the wager. The language model 195 can process the input context, including the wager attributes (and in some implementations, any associated restrictions 175), to generate a data structure corresponding to an output message 504. The output message 504 can include an explanation of the high-risk nature of the wager, potential consequences, and recommendations for reducing the risk. The client system 115 can parse the data structure to display the output message 504 via the graphical user interface 500, such as "Your proposed wager has odds of 500:1, and may result in significant financial loss. To reduce risk, please lower your wager amount and removing one or more legs from your parlay."

In some implementations, in response to receiving a second prompt 508 via the client device 115, such as "Please reduce my wager to $1,000 and remove Teams C and D from my parlay," the data processing system 105 can process the request to modify the wager. The restriction manager 155 can evaluate whether the revised wager, with a reduced wager amount and adjusted parlay legs (e.g., removing Team C and Team D), complies with applicable restrictions 175, such as limits on wager amounts or odds. The profile manager 150 can associate the updated wager attributes, including the modified bet and recalculated odds, with the player profile 170.

The data processing system 105 can update the input context for the language model 195 to indicate the revised wager attributes or associated restrictions 175, such as the reduced wager amount and the updated parlay legs. The language model 195 can process the input context, which can include the prompt, identified wager opportunity data, and other relevant information, to generate a data structure corresponding to one or more wager opportunities associated with the event. The client system 115 can parse the data structure to display a second output message 508 via the graphical user interface 500, such as "Here's your revised parlay wager for $1,000". The graphical user interface 500 can also display a wager option 510 and the combined odds 512 associated with the wager option 510. For example, the wager option 510 can specify the details of the parlay, such as "Team A to win: 1.20", and "Team B to cover the spread: 1.30". The combined odds 512 associated with the wager option, such as "1.56" or "156", can inform the player of the overall odds for the revised parlay. Upon receiving a confirmation from the player, the data processing system 105 can execute the wager opportunity 165 and update the player profile 170.

D. Computing and Network Environment

Figure 6:
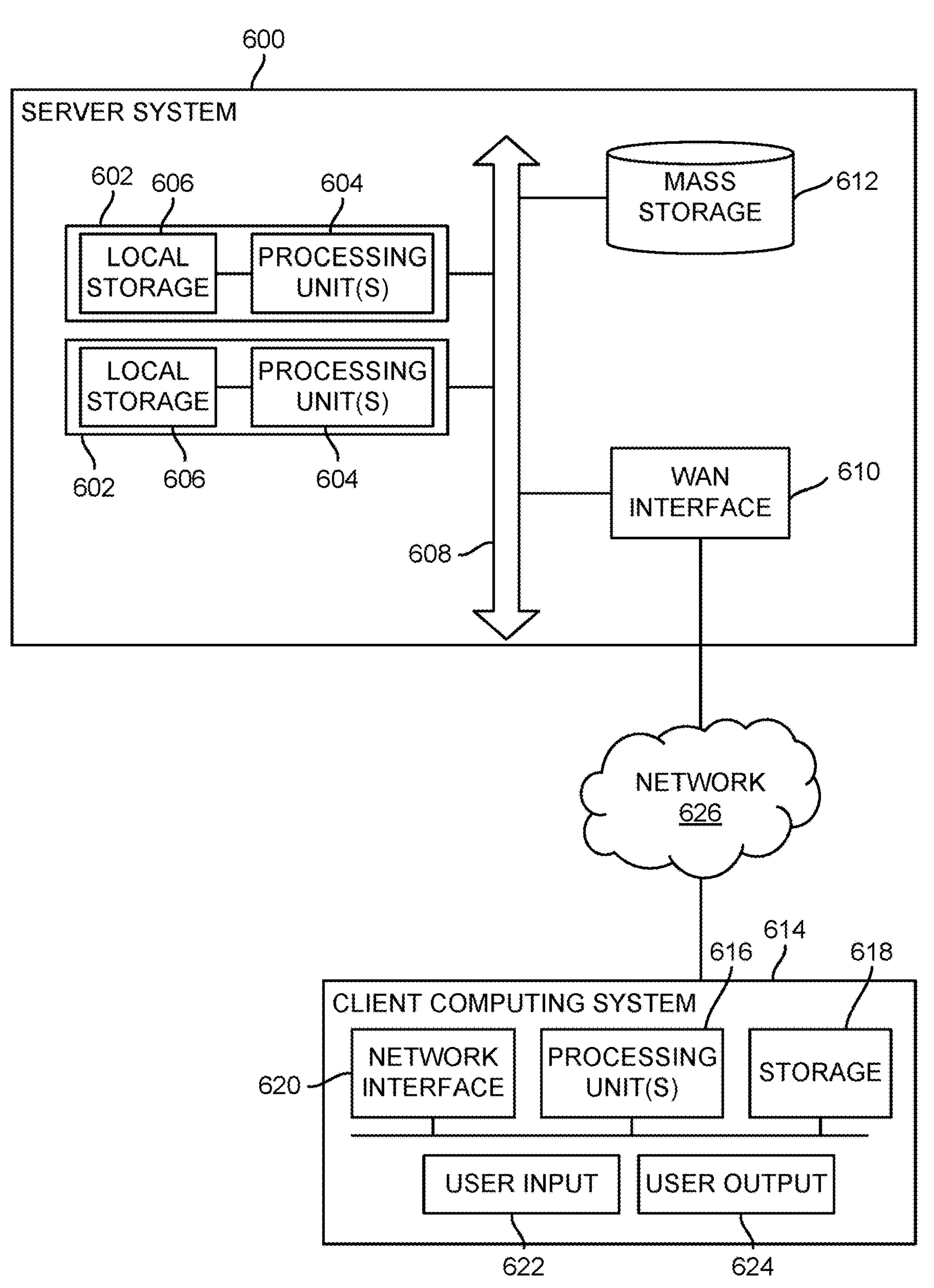
FIG. 6 illustrates a block diagram of a server system and a client computer system in accordance with an illustrative implementation.

Various operations described herein can be implemented on computer systems. FIG. 6 shows a simplified block diagram of a representative server system 600, client computer system 614, and network 626 usable to implement certain implementations of the present disclosure. In various implementations, server system 600 or similar systems can implement services or servers described herein or portions thereof. Client computer system 614 or similar systems can implement clients described herein. The system (e.g., the data processing system 105) and others described herein can be similar to the server system 600.

Server system 600 can have a modular design that incorporates a number of modules 602; while two modules 602 are shown, any number can be provided. Each module 602 can include processing unit(s) 604 and local storage 606.

Processing unit(s) 604 can include a single processor, which can have one or more cores, or multiple processors. In some implementations, processing unit(s) 604 can include a general-purpose primary processor as well as one or more special-purpose co-processors such as graphics processors, digital signal processors, or the like. In some implementations, some or all processing units 604 can be implemented using customized circuits, such as application specific integrated circuits (ASICs) or field programmable gate arrays (FPGAs). In some implementations, such integrated circuits execute instructions that are stored on the circuit itself. In other implementations, processing unit(s) 604 can execute instructions stored in local storage 606. Any type of processors in any combination can be included in processing unit(s) 604.

Local storage 606 can include volatile storage media (e.g., DRAM, SRAM, SDRAM, or the like) and/or non-volatile storage media (e.g., magnetic or optical disk, flash memory, or the like). Storage media incorporated in local storage 606 can be fixed, removable or upgradeable as desired. Local storage 606 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 604 need at runtime. The ROM can store static data and instructions that are needed by processing unit(s) 604. The permanent storage device can be a non-volatile read-and-write memory device that can store instructions and data even when module 602 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some implementations, local storage 606 can store one or more software programs to be executed by processing unit(s) 604, such as an operating system and/or programs implementing various server functions such as functions of the data processing systems 105 of FIG. 1 or any other system described herein, or any other server(s) associated with the data processing systems 105, or any other system described herein.

"Software" refers generally to sequences of instructions that, when executed by processing unit(s) 604 cause server system 600 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 604. Software can be implemented as a single program or a collection of separate programs or program modules that interact as desired. From local storage 606 (or non-local storage described below), processing unit(s) 604 can retrieve program instructions to execute and data to process in order to execute various operations described above.

In some server systems 600, multiple modules 602 can be interconnected via a bus or other interconnect 608, forming a local area network that supports communication between modules 602 and other components of server system 600. Interconnect 608 can be implemented using various technologies including server racks, hubs, routers, etc.

A wide area network (WAN) interface 610 can provide data communication capability between the local area network (interconnect 608) and the network 626, such as the Internet. Technologies can be used, including wired (e.g., Ethernet, IEEE 602.3 standards) and/or wireless technologies (e.g., Wi-Fi, IEEE 602.6 standards).

In some implementations, local storage 606 is intended to provide working memory for processing unit(s) 604, providing fast access to programs and/or data to be processed while reducing traffic on interconnect 608. Storage for larger quantities of data can be provided on the local area network by one or more mass storage subsystems 612 that can be connected to interconnect 608. Mass storage subsystem 612 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 612. In some implementations, additional data storage resources may be accessible via WAN interface 610 (potentially with increased latency).

Server system 600 can operate in response to requests received via WAN interface 610. For example, one of modules 602 can implement a supervisory function and assign discrete tasks to other modules 602 in response to received requests. Work allocation techniques can be used. As requests are processed, results can be returned to the requester via WAN interface 610. Such operation can generally be automated. Further, in some implementations, WAN interface 610 can connect multiple server systems 600 to each other, providing scalable systems capable of managing high volumes of activity. Techniques for managing server systems and server farms (collections of server systems that cooperate) can be used, including dynamic resource allocation and reallocation.

Server system 600 can interact with various user-owned or user-operated devices via a wide-area network such as the Internet. An example of a user-operated device is shown in FIG. 6 as client computing system 614. Client computing system 614 can be implemented, for example, as a consumer device such as a smartphone, other mobile phone, tablet computer, wearable computing device (e.g., smart watch, eyeglasses), desktop computer, laptop computer, and so on.

For example, client computing system 614 can communicate via WAN interface 610. Client computing system 614 can include computer components such as processing unit(s) 616, storage device 618, network interface 620, user input device 622, and user output device 424. Client computing system 614 can be a computing device implemented in a variety of form factors, such as a desktop computer, laptop computer, tablet computer, smartphone, other mobile computing device, wearable computing device, or the like.

Processor 616 and storage device 618 can be similar to processing unit(s) 604 and local storage 606 described above. Suitable devices can be selected based on the demands to be placed on client computing system 614; for example, client computing system 614 can be implemented as a "thin" client with limited processing capability or as a high-powered computing device. Client computing system 614 can be provisioned with program code executable by processing unit(s) 616 to enable various interactions with server system 600 of a message management service such as accessing messages, performing actions on messages, and other interactions described above. Some client computing systems 614 can also interact with a messaging service independently of the message management service.

Network interface 620 can provide a connection to the network 626, such as a wide area network (e.g., the Internet) to which WAN interface 610 of server system 600 is also connected. In various implementations, network interface 620 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 622 can include any device (or devices) via which a user can provide signals to client computing system 614; client computing system 614 can interpret the signals as indicative of particular user requests or information. In various implementations, user input device 622 can include any or all of a keyboard, touch pad, touch screen, mouse or other pointing device, scroll wheel, click wheel, dial, button, switch, keypad, microphone, and so on.

User output device 624 can include any device via which client computing system 614 can provide information to a user. For example, user output device 624 can include a display to display images generated by or delivered to client computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some implementations can include a device such as a touchscreen that function as both input and output device. In some implementations, other user output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 604 and 616 can provide various functionality for server system 600 and client computing system 614, including any of the functionality described herein as being performed by a server or client, or other functionality associated with message management services.

It will be appreciated that server system 600 and client computing system 614 are illustrative and that variations and modifications are possible. Computer systems used in connection with implementations of the present disclosure can have other capabilities not specifically described here. Further, while server system 600 and client computing system 614 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of these. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of these. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a player, implementations of the subject matter described in this specification can be implemented on a computer having a display device, e.g., a CRT (cathode ray tube), plasma, or LCD (liquid crystal display) monitor, for displaying information to the player and a keyboard and a pointing device, e.g., a mouse or a trackball, by which the player can provide input to the computer. Other kinds of devices can be used to provide for interaction with a player as well; for example, feedback provided to the player can include any form of sensory feedback, e.g., visual feedback, auditory feedback, or tactile feedback; and input from the player can be received in any form, including acoustic, speech, or tactile input. In addition, a computer can interact with a player by sending documents to and receiving documents from a device that is used by the player; for example, by sending web pages to a web browser on a player's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a player can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the system described herein can include clients and servers. For example, the system can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a player interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the system could be a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements; and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for providing a system, the systems and methods described herein may be applied to other environments. The foregoing implementations are illustrative, rather than limiting, of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to non-transitory memory, the one or more processors configured to:

receive a prompt for a communication session from a client device associated with a first player profile of a plurality of player profiles;

maintain a data structure storing a plurality of restrictions associated with the first player profile;

maintain, for a plurality of live events, event data usable to determine odds values for wager opportunities associated with the plurality of live events;

generate, using a language model and the prompt, an output message indicating a set of values for generation of a wager opportunity, the set of values identifying at least one of an athlete or a team;

generate, using the set of values and the event data, the wager opportunity corresponding to the set of values, the wager opportunity comprising a set of wager attributes;

identify, from the plurality of restrictions associated with the first player profile, at least one restriction applicable to the wager opportunity based on the set of wager attributes;

determine, based on the set of wager attributes, that the wager opportunity fails to satisfy at least one restriction of the plurality of restrictions for generated wager opportunities;

generate, by providing to the language model, an input context comprising the set of wager attributes and an indication of the at least one restriction that the wager opportunity does not satisfy, a second output message indicating the wager opportunity fails to satisfy the at least one restriction and describing the at least one restriction in relation to the wager attributes; and provide the second output message to the client device in response to the prompt.

2. The system of claim 1, wherein the wager opportunity comprises a parlay wager opportunity.

3. The system of claim 2, wherein the one or more processors are further configured to:

receive an indication of at least two legs for the parlay wager opportunity in the prompt; and generate the output message to include a data structure identifying data for each of the at least two legs for the parlay wager opportunity.

4. The system of claim 2, wherein the one or more processors are further configured to:

determine an odds value for the parlay wager opportunity based on respective odds values of each leg of the parlay wager opportunity; and determine that the wager opportunity fails to satisfy the at least one restriction based on the odds value exceeding a threshold of the at least one restriction.

5. The system of claim 1, wherein the one or more processors are further configured to:

identify the at least one restriction from the first player profile.

6. The system of claim 1, wherein the set of wager attributes of the wager opportunity corresponds to a first wager type, and wherein the one or more processors are further configured to:

select the at least one restriction from a plurality of restrictions based on the first wager type.

7. The system of claim 1, wherein the one or more processors are further configured to:

generate an input context for the language model using the set of wager attributes of the wager opportunity and the at least one restriction.

8. The system of claim 1, wherein the set of wager attributes comprise a time of the wager opportunity, an odds value of the wager opportunity, or a wager type of the wager opportunity.

9. The system of claim 1, wherein the at least one restriction comprises a restriction for a threshold number of wagers within a time period, wherein the one or more processors are further configured to:

determine, based on the first player profile, responsive to generating the wager opportunity, that the threshold number of wagers placed using the first player profile within the time period is exceeded; and generate the second output message to include an indication that the threshold number of wagers within the time period is exceeded.

10. The system of claim 9, wherein the one or more processors are further configured to:

provide the second output message to the client device responsive to determining that the threshold number of wagers placed using the first player profile within the time period is exceeded.

11. A method, comprising:

receiving, by one or more processors coupled to non-transitory memory, a prompt for a communication session from a client device associated with a first player profile of a plurality of player profiles;

maintaining, by the one or more processors, a data structure storing a plurality of restrictions associated with the first player profile;

maintaining, by the one or more processors, for a plurality of live events, event data usable to determine odds values for wager opportunities associated with the plurality of live events;

generating, by the one or more processors, using a language model and the prompt, an output message indicating a set of values for generation of a wager opportunity, the set of values identifying at least one of an athlete or a team;

generating, by the one or more processors, using the set of values and the event data, the wager opportunity corresponding to the set of values, the wager opportunity comprising a set of wager attributes identifying, by the one or more processors, from the plurality of restrictions associated with the first player profile, at least one restriction applicable to the wager opportunity based on the set of wager attributes;

determining, by the one or more processors, based on the set of wager attributes, that the wager opportunity fails to satisfy at least one restriction of the plurality of restrictions for generated wager opportunities;

generating, by the one or more processors, by providing to the language model, an input context comprising the set of wager attributes and an indication of the at least one restriction that the wager opportunity does not satisfy, a second output message indicating the wager opportunity fails to satisfy the at least one restriction and describing the at least one restriction in relation to the wager attributes; and providing, by the one or more processors, the second output message to the client device in response to the prompt.

12. The method of claim 11, wherein the wager opportunity comprises a parlay wager opportunity.

13. The method of claim 12, further comprising:

receiving, by the one or more processors, an indication of at least two legs for the parlay wager opportunity in the prompt; and generating, by the one or more processors, the output message to include a data structure identifying data for each of the at least two legs for the parlay wager opportunity.

14. The method of claim 12, further comprising:

determining, by the one or more processors, an odds value for the parlay wager opportunity based on respective odds values of each leg of the parlay wager opportunity; and determining, by the one or more processors, that the wager opportunity fails to satisfy the at least one restriction based on the odds value exceeding a threshold of the at least one restriction.

15. The method of claim 11, further comprising:

identifying, by the one or more processors, the at least one restriction from the first player profile.

16. The method of claim 11, wherein the set of wager attributes of the wager opportunity corresponds to a first wager type, and further comprising:

selecting, by the one or more processors, the at least one restriction from a plurality of restrictions based on the first wager type.

17. The method of claim 11, further comprising:

generating, by the one or more processors, an input context for the language model using the set of wager attributes of the wager opportunity and the at least one restriction.

18. The method of claim 11, wherein the set of wager attributes comprise a time of the wager opportunity, an odds value of the wager opportunity, or a wager type of the wager opportunity.

19. The method of claim 11, wherein the at least one restriction comprises a restriction for a threshold number of wagers within a time period, further comprising:

determining, by the one or more processors, based on the first player profile, responsive to generating the wager opportunity, that the threshold number of wagers placed using the first player profile within the time period is exceeded; and generating, by the one or more processors, the second output message to include an indication that the threshold number of wagers within the time period is exceeded.

20. The method of claim 19, further comprising:

providing, by the one or more processors, the second output message to the client device responsive to determining that the threshold number of wagers placed using the first player profile within the time period is exceeded.

* * * * *